United States Patent
Ogasahara

(10) Patent No.: US 7,965,658 B2
(45) Date of Patent: Jun. 21, 2011

(54) SHORTENING OF COMMUNICATION CUTOFF TIME

(75) Inventor: Daisaku Ogasahara, Minato-ku (JP)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 12/363,299

(22) Filed: Jan. 30, 2009

(65) Prior Publication Data
US 2009/0196171 A1 Aug. 6, 2009

(30) Foreign Application Priority Data

Feb. 4, 2008 (JP) ................................. 2008-024070

(51) Int. Cl.
H04L 12/28 (2006.01)
G01R 31/08 (2006.01)
(52) U.S. Cl. ................... 370/258; 370/223; 370/392
(58) Field of Classification Search .................. None
See application file for complete search history.

(56) References Cited

U.S. PATENT DOCUMENTS

| 5,101,348 | A | * | 3/1992 | Arrowood et al. ............ 709/242 |
| 2006/0002311 | A1 | * | 1/2006 | Iwanaga et al. ............... 370/254 |
| 2007/0230368 | A1 | * | 10/2007 | Shi et al. ...................... 370/254 |

FOREIGN PATENT DOCUMENTS

| JP | 08-125679 A | 5/1996 |
| JP | 2003-234747 A | 8/2003 |
| JP | 2004-242194 A | 8/2004 |
| JP | 2005-027039 A | 1/2005 |
| JP | 2005-159701 A | 6/2005 |
| JP | 2006-180214 A | 7/2006 |

OTHER PUBLICATIONS

IEEE Computer Society, "Part 17: Resilient packet ring (RPR) access method and physical layer specifications," IEEE Std. 802.17-2004, Sep. 24, 2004.

* cited by examiner

Primary Examiner — Kwang B Yao
Assistant Examiner — Jutai Kao
(74) Attorney, Agent, or Firm — Sughrue Mion, PLLC

(57) ABSTRACT

A topological information management frame is classified based on the contents stored in the topological information management frame, and information stored in a database is updated based on the contents stored in the topological information management frame depending on the classification of the topological information management frame.

7 Claims, 19 Drawing Sheets

Fig. 7

| NUMBER OF HOPS | RPR NODE IDENTIFIER | CONNECTION INFORMATION | | PROTECTION INFORMATION | | SEQUENCE NUMBER | VALIDITY INFORMATION |
|---|---|---|---|---|---|---|---|
| | | PORT 1 | PORT 2 | PORT 1 | PORT 2 | | |
| 0 | MAC ADDRESS OF RPR NODE 1000 | NORMAL | NORMAL | IDLE | IDLE | 10 | VALID |
| 1 | MAC ADDRESS OF RPR NODE 1700 | NORMAL | NORMAL | IDLE | IDLE | 500 | VALID |
| 2 | MAC ADDRESS OF RPR NODE 1600 | NORMAL | NORMAL | IDLE | IDLE | 300 | VALID |
| 3 | MAC ADDRESS OF RPR NODE 1500 | NORMAL | NORMAL | IDLE | IDLE | 250 | VALID |
| 4 | MAC ADDRESS OF RPR NODE 1400 | NORMAL | NORMAL | IDLE | IDLE | 150 | VALID |
| 5 | MAC ADDRESS OF RPR NODE 1300 | NORMAL | NORMAL | IDLE | IDLE | 200 | VALID |
| 6 | MAC ADDRESS OF RPR NODE 1200 | NORMAL | NORMAL | IDLE | IDLE | 1000 | VALID |
| 7 | MAC ADDRESS OF RPR NODE 1100 | NORMAL | NORMAL | IDLE | IDLE | 100 | VALID |

| NUMBER OF HOPS | RPR NODE IDENTIFIER | CONNECTION INFORMATION | | PROTECTION INFORMATION | | SEQUENCE NUMBER | VALIDITY INFORMATION |
|---|---|---|---|---|---|---|---|
| | | PORT 1 | PORT 2 | PORT 1 | PORT 2 | | |
| 0 | MAC ADDRESS OF RPR NODE 1000 | NORMAL | NORMAL | IDLE | IDLE | 10 | VALID |
| 1 | MAC ADDRESS OF RPR NODE 1100 | NORMAL | NORMAL | IDLE | IDLE | 100 | VALID |
| 2 | MAC ADDRESS OF RPR NODE 1200 | NORMAL | NORMAL | IDLE | IDLE | 1000 | VALID |
| 3 | MAC ADDRESS OF RPR NODE 1300 | NORMAL | NORMAL | IDLE | IDLE | 200 | VALID |
| 4 | MAC ADDRESS OF RPR NODE 1400 | NORMAL | NORMAL | IDLE | IDLE | 150 | VALID |
| 5 | MAC ADDRESS OF RPR NODE 1500 | NORMAL | NORMAL | IDLE | IDLE | 250 | VALID |
| 6 | MAC ADDRESS OF RPR NODE 1600 | NORMAL | NORMAL | IDLE | IDLE | 300 | VALID |
| 7 | MAC ADDRESS OF RPR NODE 1700 | NORMAL | NORMAL | IDLE | IDLE | 500 | VALID |

| NUMBER OF HOPS | RPR NODE IDENTIFIER | CONNECTION INFORMATION | | PROTECTION INFORMATION | | SEQUENCE NUMBER | VALIDITY INFORMATION | PROVISIONAL VALIDITY INFORMATION |
|---|---|---|---|---|---|---|---|---|
| | | PORT 1 | PORT 2 | PORT 1 | PORT 2 | | | |
| 0 | MAC ADDRESS OF RPR NODE 100 | NORMAL | NORMAL | IDLE | IDLE | 10 | VALID | VALID |
| 1 | MAC ADDRESS OF RPR NODE 170 | NORMAL | NORMAL | IDLE | IDLE | 500 | VALID | VALID |
| 2 | MAC ADDRESS OF RPR NODE 160 | NORMAL | NORMAL | IDLE | IDLE | 300 | VALID | VALID |
| 3 | MAC ADDRESS OF RPR NODE 150 | NORMAL | NORMAL | IDLE | IDLE | 250 | VALID | VALID |
| 4 | MAC ADDRESS OF RPR NODE 140 | NORMAL | NORMAL | IDLE | IDLE | 150 | VALID | VALID |
| 5 | MAC ADDRESS OF RPR NODE 130 | NORMAL | NORMAL | IDLE | IDLE | 200 | VALID | VALID |
| 6 | MAC ADDRESS OF RPR NODE 120 | NORMAL | NORMAL | IDLE | IDLE | 1000 | VALID | VALID |
| 7 | MAC ADDRESS OF RPR NODE 110 | NORMAL | NORMAL | IDLE | IDLE | 100 | VALID | VALID |

| NUMBER OF HOPS | RPR NODE IDENTIFIER | CONNECTION INFORMATION | | PROTECTION INFORMATION | | SEQUENCE NUMBER | VALIDITY INFORMATION | PROVISIONAL VALIDITY INFORMATION |
| --- | --- | --- | --- | --- | --- | --- | --- | --- |
| | | PORT 1 | PORT 2 | PORT 1 | PORT 2 | | | |
| 0 | MAC ADDRESS OF RPR NODE 100 | NORMAL | NORMAL | IDLE | IDLE | 10 | VALID | VALID |
| 1 | MAC ADDRESS OF RPR NODE 110 | NORMAL | NORMAL | IDLE | IDLE | 100 | VALID | VALID |
| 2 | MAC ADDRESS OF RPR NODE 120 | NORMAL | NORMAL | IDLE | IDLE | 1000 | VALID | VALID |
| 3 | MAC ADDRESS OF RPR NODE 130 | NORMAL | NORMAL | IDLE | IDLE | 200 | VALID | VALID |
| 4 | MAC ADDRESS OF RPR NODE 140 | NORMAL | NORMAL | IDLE | IDLE | 150 | VALID | VALID |
| 5 | MAC ADDRESS OF RPR NODE 150 | NORMAL | NORMAL | IDLE | IDLE | 250 | VALID | VALID |
| 6 | MAC ADDRESS OF RPR NODE 160 | NORMAL | NORMAL | IDLE | IDLE | 300 | VALID | VALID |
| 7 | MAC ADDRESS OF RPR NODE 170 | NORMAL | NORMAL | IDLE | IDLE | 500 | VALID | VALID |

730

SHORTENING OF COMMUNICATION CUTOFF TIME

This application is based upon and claims the benefit of priority from Japanese Patent Application No. 2008-024070 filed on Feb. 4, 2008, the content of which is incorporated by reference.

BACKGROUND OF THE INVENTION

1. Field of the Invention

The present invention relates to a network node for a dual ring network for bidirectionally transferring communication frames, a communication system, a method of changing states in a network node, and a recording medium.

2. Description of the Related Art

The widespread penetration of the Internet has been giving the users opportunities to use the Internet not only for transferring data but also for performing communications and distributing images. As a result, the traffic in a backbone communication system has been rapidly growing.

Therefore, the reliability technology for avoiding communication cutoffs due to anomalies such as link disconnections, network node faults, etc. is highly important for continuously providing stable communications.

The packet network technology, referred to as Ethernet, for constructing the backbone communication system has widely been used in view of its intrinsic advantages such as low cost and convenience and additional merits such as increased reliability and band control function implementation.

Hereinafter, a network incorporating Resilient Packet Ring (RPR) (hereinafter referred to as "RPR network") disclosed in IEEE Standards 802.17, which is a standardization document issued by IEEE (the Institute of Electrical and Electronics Engineers), 2004 (Document: "RPR (Resilient Packet Ring)", IEEE Standards 802.17, IEEE 2004) will be described as a highly reliable packet network for the backbone communication network.

FIG. 1 of the accompanying drawings shows a communication system comprising RPR network 3000 based on a network protocol for constructing a dual ring network having rings (ringlets) for transferring communication frames (packets storing information to be sent and received) in opposite directions (clockwise and counterclockwise directions).

The communication system shown in FIG. 1 includes eight nodes operable according to the RPR (RPR nodes 1000, 1100, 1200, 1300, 1400, 1500, 1600, 1700) making up RPR network 3000, and terminals 2000, 2100, 2200, 2300, 2400, 2500, 2600, 2700 accommodated respectively under RPR nodes 1000, 1100, 1200, 1300, 1400, 1500, 1600, 1700.

One known feature of the RPR is a high-speed protection function with a short fault recovery time.

For example, even if a link between RPR nodes is cut off, all the other RPR nodes are quickly notified of the link cutoff immediately after the RPR nodes on both sides of the link detect the link cutoff. The other RPR nodes which have received the notification of the failure change into an operating state for sending the traffic in bypassing relation to the link cutoff. Accordingly, the communication system can continue its communicating operation.

The RPR is designed to recover communications in a short time within 50 milliseconds, equivalent to the recovery time of the SDH or SONET according to the related art, on the premise of its use in a backbone communication system with a large traffic such as a metropolitan network. Therefore, the RPR makes it possible to construct a highly reliable communication system.

(Operation of the RPR Protection Scheme for Failure Recovery)

Operation of the RPR protection scheme disclosed in IEEE 802.17 for failure recovery, e.g., operational details of RPR nodes 1000, 1100, 1200, 1300, 1400, 1500, 1600, 1700 of RPR network 3000 shown in FIG. 1, will be described below.

(The Node Configuration of a General RPR Node).

The node configuration of only RPR node 1000 will be described below. The node configuration of RPR nodes 1100, 1200, 1300, 1400, 1500, 1600, 1700 is identical to the node configuration of RPR node 1000.

As shown in FIG. 2 of the accompanying drawings, RPR node 1000 comprises input ports 500-1 through 500-3, frame analyzers 510-1, 510-2, RPR switch processor 520, frame multiplexers 530-1, 530-2, output ports 540-1 through 540-3, port state monitor 550, topology analyzer 5600, TDB 5700, and MAC address management table 580.

Input ports 500-1 through 500-3 of RPR node 1000 correspond respectively to reception sides of ports P1 through P3 of RPR node 1000 shown in FIG. 1. Input ports 500-1 through 500-3 serve as ports for receiving RPR frames sent from adjacent RPR nodes or receiving a data frame sent from the terminal under RPR node 1000.

Specifically, input port 500-1 of RPR node 1000 is a port for receiving an RPR frame sent from output port 540-1 of RPR node 1100.

Input port 500-2 of RPR node 1000 is a port for receiving an RPR frame sent from output port 540-1 of RPR node 1700.

Input port 500-3 of RPR node 1000 is a port for receiving data frame sent from terminal 2000 under RPR node 1000.

Frame analyzers 510-1, 510-2 of RPR node 1000 identify frames received by input ports 500-1 through 500-3. Frame analyzers 510-1, 510-2 also send a topology protection frame (a topological information management frame, hereinafter referred to as TP frame) for managing topological information to topology analyzer 5600. Frame analyzers 510-1, 510-2 send other RPR frames to RPR switch processor 520 of RPR node 1000.

A process performed by frame analyzers 510-1, 510-2 shown in FIG. 2 will be described below with reference to FIG. 3 of the accompanying drawings.

In step 101, frame analyzers 510-1, 510-2 determine whether an RPR frame received thereby is a TP frame or not.

If it is judged in step 101 that the received RPR frame is not a TP frame, then frame analyzers 510-1, 510-2 send the RPR frame to RPR switch processor 520 in step 102.

If it is judged in step 101 that the received RPR frame is a TP frame, then frame analyzers 510-1, 510-2 send the TP frame to topology analyzer 5600 in step 103.

The TP frame is a control frame defined by IEEE 802.17, and an RPR frame advertised by each RPR node in a time period determined by IEEE 802.17 in order to indicate the information held by the RPR node to the other RPR nodes.

RPR switch processor 520 of RPR node 1000 performs various processes regarding the RPR defined by IEEE 802.17.

For example, the processes performed by RPR switch processor 520 of RPR node 1000 include the transfer of an RPR frame received from an adjacent RPR node, the dynamic control of the communication band of the traffic on RPR network 3000 to achieve fairness, the operational management of RPR network 3000 according to OAM (Operations, Administration, Maintenance), the generation of an RPR frame from a data frame received from the terminal, and the extraction and transmission to the terminal of a data frame stored in an RPR frame.

The above processes performed by RPR switch processor 520 will not be described in detail below, except for the operation deeply involved in the operation of the RPR node.

Frame multiplexers 530-1, 530-2 of RPR node 1000 multiplex RPR frames sent from RPR switch processor 520 of RPR node 1000 and a TP frame sent from topology analyzer 5600, and send the multiplexed frames from output ports 540-1, 540-2 of RPR node 1000.

Output ports 540-1 through 540-2 of RPR node 1000 correspond to transmission sides of ports P1 through P3 of RPR node 1000 shown in FIG. 1. Output ports 540-1 through 540-3 serve as ports for sending RPR frames to adjacent RPR nodes or sending an Ethernet frame to the terminal under RPR node 1000.

Specifically, output port 540-1 of RPR node 1000 is a port for sending an RPR frame to input port 500-1 of RPR node 1100.

Output port 540-2 of RPR node 1000 is a port for sending an RPR frame to input port 500-1 of RPR node 1700.

Output port 540-3 of RPR node 1000 is a port for sending an Ethernet frame to terminal 2000 under RPR node 1000.

Port state monitor 550 of RPR node 1000 notifies topology analyzer 5600 of RPR node 1000 of the connection states of input ports 500-1, 500-2 and output ports 540-1, 540-2 of RPR node 1000.

The connection state of each port indicates whether the port is capable of communicating with an adjacent RPR node connected to the port or not. The connection state in which the port is capable of communicating with an adjacent RPR node is referred to as a normal state. The connection state in which the port is incapable of communicating with an adjacent RPR node is referred to as an edge state.

Topology analyzer 5600 of RPR node 1000 manages the topological state of RPR network 3000 based on the Topology Discovery Protocol described in IEEE 802.17.

The topological state is represented by the total of various items of information about the RPR network, including the number of the RPR nodes of the RPR network, the positions of the RPR nodes, the occurrence of failures, the settings of the RPR nodes, etc. The position of a cutoff link, the position of a failed RPR node, etc. of the RPR network can be known by referring to the topological state.

Processing blocks shown in FIG. 4 of the accompanying drawings, which make up topology analyzer 5600 of RPR node 1000, will be described below.

TP (topology) frame analysis processor 6000 of RPR frame 1000 classifies TP frames received from frame analyzers 510-1, 510-2 of RPR node 1000. Specifically, TP frame analysis processor 6000 stores a TP frame which needs to be further analyzed into analysis processing queue 610, and discards other frames.

A processing sequence carried out by TP frame analysis processor 6000 shown in FIG. 4 will be described below with reference to FIG. 5 of the accompanying drawings. Details of the processing sequence will be described later.

Analysis processing queue 610 of RPR node 1000 comprises a buffer memory for storing a TP frame which needs to be analyzed Topology analysis processor 620 of RPR node 1000 analyzes the topological state of RPR network 3000 based on the result of the analysis of the TP frame stored in analysis processing queue 610 of RPR node 1000 and the connection states of ports P1, P2 of RPR node 1000 which have been acquired from port state monitor 550 of RPR node 1000. Based on the result of the analysis, topology analysis processor 620 instructs TDB updating processor 630 of RPR node 1000 to update the contents of TDB 5700 of RPR node 1000.

Based on the result of the analysis of the topological state of RPR network 3000, topology analysis processor 620 also instructs TP frame transmission processor 640 to change the period in which to sent a TP frame.

TDB updating processor 630 of RPR node 1000 is a database updating processor 630 for updating the contents of TDB 5700 of RPR node 1000 according to an instruction from topology analysis processor 620 of RPR node 1000.

TP frame transmission processor 640 of RPR node 1000 generates a TP frame according to the contents of TDB 5700 of RPR node 1000, and sends the generated TP frame to frame multiplexers 530-1, 530-2 of RPR node 1000 in a predetermined time period.

Frame multiplexers 530-1, 530-2 of RPR node 1000 multiplexes the TP frame with frames sent from RPR switch processor 520 of RPR node 1000, and broadcast the multiplexed frames in both clockwise and counterclockwise directions.

The time period in which TP frame transmission processor 640 of RPR node 1000 sends the TP frame may temporarily be shortened by the instruction from topology analysis processor 620 of RPR node 1000, as described later.

The processing blocks which make up topology analyzer 5600 of RPR node 1000 have been described above.

Other processing blocks of RPR node 1000 will be described below.

TDB (Topology DataBase) 5700 of RPR node 1000 is a database for storing information about the topological state of RPR network 3000. TDB 5700 is managed by topology analyzer 5600 of RPR node 1000.

As shown in FIG. 6 of the accompanying drawings, TDB 5700 of RPR node 1000 is made up of four databases including RPR network information database 700, RPR node information database 710, ringlet 0 information database 7200, and ringlet 1 information database 7300.

RPR network information database 700 is a database for storing information about RPR network 3000 in its entirety such as the number of the RPR nodes of RPR network 3000, etc.

RPR node information database 710 is a database for storing information about RPR node 1000 such as a node identifier of RPR node 1000, etc.

Ringlet 0 information database 7200 is a database for storing information about RPR nodes disposed on a ring (ringlet 0) for transferring RPR frames in the clockwise direction.

Ringlet 1 information database 7300 is a database for storing information about RPR nodes disposed on a ring (ringlet 1) for transferring RPR frames in the counterclockwise direction.

The term "ringlet information database" which will hereinafter be used means at least one of ringlet 0 information database 7200 and ringlet 1 information database 7300.

As shown in FIGS. 7 and 8 of the accompanying drawings, ringlet 0 information database 7200 and Ringlet 1 information database 7300 manage the number of hops from RPR node 1000, the node identifiers of RPR nodes disposed in the number of hops, the connection states and the protection states of ports P1, P2 of the RPR nodes, the sequence numbers of TP frames in which the information of the connection states and the protection states is stored, and validity information indicating whether the entries of the ringlet information database are valid or invalid.

According to IEEE 802.17, various items of information other than the above information are managed. However, those various other items of information are omitted from illustration for the sake of brevity.

MAC address management table 580 of RPR node 1000 is a table for managing a MAC address assigned as the node identifier of RPR node 1000. MAC address management table 580 is set by the administrator the communication system through the management interface, and is referred to by topology analyzer 5600 of RPR node 1000.

The node identifier of RPR node 1000 is also stored in RPR node information database 710 of RPR node 1000. The node identifier of RPR node 1000 is referred to when RPR switch processor 520 of RPR node 1000 performs the various processes, such as the process of generating an RPR frame.

(Process of Acquiring the Topological State of the RPR Network)

The RPR node broadcasts a TP frame in a certain time period in both clockwise and counterclockwise directions in order to indicate information about its own protection to the other RPR nodes.

The TP frame sent from the RPR node stores therein the connection states and the protection states of ports P1, P2 of each RPR node, the sequence numbers, TTL (Time To Live).

As described above, the connection state of a port is either the normal state or the edge state. The normal state is a state in which the port is capable of communicating with an adjacent RPR node, and the edge state is a state in which the port is incapable of communicating with an adjacent RPR node.

The connection state of the port is indicated to topology analyzer 5600 by port state monitor 550 of the RPR node.

The protection state of a port is determined by topology analysis processor 620 based on the connection state of the port.

There are several types of the protection state defined according to IEEE 802.17. For the sake of brevity, only an idle state and an SF (Signal Fail) state of those several types will be described below.

The idle state is a state in which the connection state of the port is the normal state and no protection needs to be activated. The SF state is a state in which the connection state of the port is the edge state and protection needs to be activated.

The sequence number is incremented each time the connection state or protection state of a port is changed.

When TP frame transmission processor 640 of the RPR node detects an update on the connection state or protection state of port P1 or P2 of its own, TP frame transmission processor 640 stores a sequence number which has a value incremented from the sequence number prior to the detection of the update, in a subsequently generated TP frame.

The other RPR nodes which have received the subsequently generated TP frame are thus able to recognize the changed connection state or protection state simply by confirming the change in the sequence number of the TP frame.

If the sequence number of the TP frame has not been changed, the connection state or protection state of the port of the RPR node which has sent the TP frame is regarded as not changing, and further analysis processing of the TP frame is interrupted, thereby reducing the processing burden for analyzing the topological state of the RPR network.

The above process is performed by TP frame analysis processor 6000 of the RPR node according to the flowchart shown in FIG. 5.

The TTL represents a maximum value of the number of times that a TP frame can be relayed. The TTL has an initial value of 255. The TTL is decremented each time the TP frame is relayed through an RPR node. Therefore, the maximum number of RPR nodes making up the RPR network is 255. The RPR node can acquire the number of hops from itself to an RPR node which has sent the TP frame by calculating the difference between the initial TTL value=255 and the value of the TTL of the TP frame.

The RPR node can acquire the topological state of the RPR network by analyzing the positions of the RPR nodes and the connections of the links between the RPR nodes based on the connection states and the protection states of ports P1, P2 of its own, the connection states and the protection states of ports P1, P2 of other RPR ports acquired from TP frames sent from the other RPR ports, and the TTL.

The topological state of the RPR network thus acquired is managed by TDB 5700 of the RPR node.

(Operation of the RPR Node in the Event of a Failure)

Operation of the RPR protection scheme in the event that the link interconnecting port P1 of RPR node 1300 and port P2 of RPR node 1400 shown in FIG. 1 is cut off will be described in detail below.

When topology analysis processor 620 of RPR node 1300 is notified that the connection state of port P1 has changed to the edge state from port state monitor 550 of RPR node 1300, topology analysis processor 620 changes the protection state of port P1 to the SF state. Then, topology analysis processor 620 instructs TDB updating processor 630 of RPR node 1300 to change information about RPR node 1300 in RPR node information database 710 of TDB 5700.

At the same time, topology analysis processor 620 of RPR node 1300 instructs TP frame transmission processor 640 of RPR node 1300 to send a TP frame ten times in succession in a transmission period shorter than a normal TP transmission period, so that TP frames sent from RPR node 1300 and RPR node 1400 will quickly and reliably be received by other RPR nodes.

As a result, TP frame transmission processor 640 of RPR node 1300 changes the connection state and the protection state of port P1 of the TP frame respectively to the edge state and the SF state. TP frame transmission processor 640 also increments the sequence number and broadcasts the TP frame in a time period shorter than normal.

The above operation of RPR node 1300 is the same as the operation of the RPR node 1400.

Operation of other RPR nodes which have received TP frames from RPR node 1300 and RPR node 1400 will be described below with reference to the flowchart shown in FIG. 5 which is carried out by TP frame analysis processor 6000. Specifically, operation of RPR node 1000 which has received at its port P1 a TP frame sent from RPR node 1300 in the counterclockwise direction will be described by way of example.

When the TP frame sent from RPR node 1300 is received by port P1 of RPR node 1000, it is sent to frame analyzer 510-1 of RPR node 1000.

Since the frame received by the analyzer 510-1 of RPR node 1000 is the TP frame, it sends the received TP frame to TP frame analysis processor 6000 of topology analyzer 5600 of RPR node 1000.

If the sequence number stored in the TP frame is not in conformity with the sequence number of the source RPR node (RPR node 1300) from which the TR frame has been sent, stored in ringlet 1 information database 130 of TDB 5700, or if the validity information indicates that the entry storing the information about the source node is invalid (Yes in step 111), then TP frame analysis processor 6000 of RPR node 1000 stores the TP frame into analysis processing queue 610 of RPR node 1000 in step 112. Otherwise (No in step 111), then TP frame analysis processor 6000 discards the TP frame.

Based on the contents of the TP frame stored in analysis processing queue 610 of RPR node 1000, topology analysis processor 620 of RPR node 1000 analyzes the topological state of RPR network 3000.

Since the connection state of port P1 of RPR node 1300 is the edge state and the protection state thereof is the SF state, topology analysis processor 620 of RPR node 1000 recognizes that it is impossible to transfer data frames destined for RPR nodes 1400, 1500, 1600, 1700 that are located downstream of RPR node 1300 in the clockwise direction. Topology analysis processor 620 of RPR node 1000 then instructs TDB updating processor 630 of RPR node 1000 to update the connection state and the protection state of port P1 of RPR node 1300 and the sequence number in ringlet 1 information database 7300 of RPR node 1000 and also to invalidate the validity information of RPR nodes 1400, 1500, 1600, 1700 in ringlet 1 information database 7300 of RPR node 1000.

With the contents of TDB 5700 of RPR node 100 being thus updated by the above process, even if RPR node 1000 receives a TP frame sent in a short time period from RPR node 1300, since the sequence number of the TP frame and the sequence number stored in TDB 5700 are the same as each other, the TP frame is discarded by TP frame analysis processor 6000 of RPR node 1000. Consequently, the analyzing process does not need to be performed again.

Similarly, when RPR node 1000 receives a TP frame sent in the clockwise direction from RPR node 1400, the information about port P2 of RPR node 1400 which is stored in ringlet 0 information database 7200 of RPR node 100 is updated. At the same time, the validity information of the entries with respect to RPR nodes 1100, 1200, 1300 which is stored in ringlet 0 information database 7200 of RPR node 100 is invalidated.

Other RPR nodes 1100, 1200, 1300, 1400, 1500, 1600, 1700 operates in the same manner.

Thereafter, after elapse of a given time from the time when a change in the connection state of ports P1, P2 of its own or a change in the topological state based on a TP frame received from another node is detected, each of RPR nodes 1000, 1100, 1200, 1300, 1400, 1500, 1600, 1700 can determine the topological state of RPR network 3000 if it can confirm that the topological states of RPR network 3000 which are recognized by itself and adjacent RPR nodes (for RPR node 1300 and RPR node 1400, adjacent RPR nodes with which they can communicate) are identical to each other.

According to IEEE 802.17, the topological state identity between RPR nodes is confirmed when the values of checksums calculated from the sequence numbers of the RPR nodes stored in their TDBs 5700 are in conformity with each other.

Subsequently, the identity of the topological states of the RPR network which are held respectively by two RPR nodes may be described simply as the contents of their TDBs being in conformity with each other.

If the topological states of the RPR network as recognized by RPR nodes are not in conformity with each other, then either one of the RPR nodes may have possibly failed to receive a TP frame sent from RPR node 1300 or RPR node 1400. Therefore, after having further waited for a given time, it is confirmed again whether the topological states of the RPR network as recognized by the RPR nodes are in conformity with each other or not.

If the topological states are not in conformity with each other after they have been confirmed a predetermined number of times, then the RPR nodes interrupt the process of determining the topological state of the RPR network.

The sequence of data frames that arrive at RPR node 1300 and RPR node 1400 may possibly be changed when the direction in which the data frames are sent is changed during a period from the detection of a failure until the topological state of RPR network 3000 is determined. The sequence of data frames that arrive at other RPR nodes may possibly be changed when the direction in which the data frames are sent is changed during a period from the reception of a TP frame from RPR node 1300 or RPR node 1400 until the topological state of RPR network 3000 is determined. Therefore, those RPR nodes stop sending data frames and resume sending data frames after topological state of RPR network 3000 is determined.

If the process of determining the topological state is interrupted because the topological states of the RPR network as recognized by an RPR node and adjacent RPR nodes are not in conformity with each other, then the RPR node is unable to resume communications. As a result, communications are caused to stop.

If the topological state of the RPR network is determined because the contents of the TDBs of the RPR node and the adjacent RPR nodes are in conformity with each other, then when the RPR node is to send a data frame to the RPR network, it can recognize which one of the clockwise direction and the counterclockwise directions is effective to relay the data frame to a destination RPR node by referring to the validity information in the TDB. Therefore, communications can be continued even in the event of a failure.

The RPR nodes other than the RPR node which has detected a failure can update their TDBs simply by receiving one TP frame sent from the RPR node which has detected the failure. Accordingly, the new topological state of the RPR network can be determined in a short period of time, making it possible to resume communications in a short period of time.

According to IEEE 802.17, a variable referred to when a data frame is sent out is actually a variable called connectivity information. For failures to be handled according to the present invention, connectivity information and validity information may be considered as equivalent variable. According to the present invention, the handling of the validity information is important. Therefore, the connectivity information is regarded as a variable equivalent to the validity information.

The protection scheme disclosed in the above document is problematic in that communications tend to be broken for a long period of time when the sequence cut backs from a failure state (an abnormal state or an abnormal time) to a pre-failure state (a normal state or a normal time) by way of restoration from the failure.

If the number of RPR nodes making up the RPR network increases, then not only the resumption of communications is delayed, but also the topological state of the RPR network cannot be determined. As a consequence, a disastrous event such as an RPR network shutdown is liable to occur.

According to the protection scheme disclosed in IEEE 802.17, in the event of a failure, an RPR node can complete the updating of its own TDB simply by receiving a TP frame sent from the RPR node which has detected the failure. Nevertheless, when the sequence cuts back, the RPR node needs to receive TP frames sent from all the RPR nodes whose validity information in the TDBs is invalid and to validate the validity information of the RPR nodes. Consequently, the burden on the process of analyzing the TP frames is increased.

(Cut-back Operation of an RPR Node)

Operation of an RPR node to cut back from an abnormal state to a normal state according to IEEE 802.17, e.g., when the link between RPR node 1300 and RPR node 1400 which has been cut off as described in the related art is reconnected by way of restoration, will be described in detail below.

When topology analysis processor 620 of RPR node 1000 is notified that the connection state of port P1 has changed to the normal state from port state monitor 550 of RPR node, topology analysis processor 620 changes the protection state of port P1 to the idle state. Then, topology analysis processor 620 instructs TDB updating processor 630 of RPR node 1300 to change information about its own port P1 in TDB 5700.

Subsequent operation of RPR node 1300 is the same as when the link is cut off, and will not be described below.

Operation of RPR node 1400 is the same as the above operation of RPR node 1300.

Operation of RPR nodes 1000, 1200, 1500, 1600, 1700 when they have received a TP frame from RPR node 1300 or RPR node 1400, e.g., operation of RPR node 1000 when it has received a TP frame sent from RPR node 1300 in the counterclockwise direction, will be described in detail below.

RPR node 1000 receives at port P1 thereof a TP frame sent from RPR node 1300 in the counterclockwise direction, and updates the connection state, the protection state, and the sequence number of RPR node 1300 in ringlet 1 information database 7300, in the same manner as described above with respect to the related art.

However, of the entries of ringlet 1 information database 7300 which have been invalidated when the link has been cut off, only the entry with respect to RPR node 1300 is validated, and the validity information of the entries with respect to other RPR nodes 1400, 1500, 1600, 1700 remains invalid, unlike the operation at the time of occurrence of the failure.

When topology analysis processor 620 of RPR node 1000 detects the recovery of a link on RPR network 3000, it instructs TP frame transmission processor 640 of RPR node 1000 to send a TP frame ten times in a time period shorter than a normal time period, unlike the operation at the time of occurrence of the failure.

RPR node 1000 also operates in the same manner when it has received a TP frame sent from RPR node 1300 in the clockwise direction or it has received a TP frame sent from RPR node 1400 in the clockwise direction or the counterclockwise direction.

Operation of other RPR nodes 1100, 1200, 1500, 1600, 1700 is also the same as the above operation of RPR node 1000.

Operation of an RPR node when it has received a TP frame sent from an RPR node whose validity information of the entry in the TDB is invalidated by the occurrence of a failure, e.g., when RPR node 1000 has received in its port P1 a TP frame sent from RPR node 1500 in the counterclockwise direction, will be described below.

When RPR node 1000 receives in its port P1 a TP frame sent from RPR node 1500 in the counterclockwise direction, TP frame analysis processor 6000 of RPR node 1000 is unable to detect a change in the sequence number even by comparing the sequence number of the TP frame and the sequence number of RPR node 1500 which is stored in ringlet 1 information database 7300 of RPR node 1000, as is the case with the occurrence of a failure. Therefore, TP frame analysis processor 6000 of RPR node 1000 refers to the validity information of the entry with respect to RPR 1500 which is stored in ringlet 1 information database 7300.

If the validity information of the entry with respect to RPR 1500 which is stored in ringlet 1 information database 7300 is invalid, then TP frame analysis processor 6000 of RPR node 1000 stores the TP frame into analysis processing queue 610 of RPR node 1000. If the validity information of the entry with respect to RPR 1500 which is stored in ringlet 1 information database 7300 is valid, then TP frame analysis processor 6000 of RPR node 1000 discards the TP frame.

The contents of the TP frame stored in analysis processing queue 610 of RPR node 1000 and the contents stored in ringlet 1 information database 7300 of RPR node 1000 are identical to each other. Therefore, topology analysis processor 620 of RPR node 1000 instructs TDB updating processor 630 of RPR node 1000 only to validate the validity information of the entry with respect to RPR 1500 which is stored in ringlet 1 information database 7300 of RPR node 1000.

At the same time, topology analysis processor 620 of RPR node 1000 instructs TP frame transmission processor 640 of RPR node 1000 to send a TP frame ten times in a time period shorter than a normal time period.

Specifically, when the sequence cuts back, the RPR node is triggered by both the reception of a TP frame from the RPR node which has detected the failure and the reception of a TP frame from the RPR node whose validity information has been invalidated when the failure has occurred, to shorten the transmission period for the TP frame while the TP frame is sent ten times.

It is confirmed that the contents of the TDBs of RPR node 1300 and RPR node 1400 and the adjacent RPR nodes are in conformity with each other after elapse of a given time from the detection of the recovery of the link, as described above in the related art. It is confirmed that the contents of the TDBs of the other RPR nodes and the adjacent RPR nodes are in conformity with each other after elapse of a given time from the reception of a TP frame sent from RPR node 1300 or RPR node 1400, as described above in the related art. When the topological state of the RPR network is determined thereby, the RPR network returns to the state prior to the occurrence of the failure.

During the process of determining the topological state of the RPR network, the sequence of data frames that arrive may possibly be changed when the direction in which the data frames are sent is changed, as is the case with the occurrence of a failure. Therefore, the transmission of data frames is caused to stop, and is resumed after the topological state of the RPR network is determined.

It will be understood that while the sequence is cutting back, a large number of TP frames are transmitted in a shorter period of time than when the RPR network operates in the even of a failure.

In the event of a failure, each of the RPR nodes performs the process of sending a TP frame in a shortened period only when the validity information of the entries with respect to two RPR nodes which have detected the failure is validated. When the sequence cuts back, each of the RPR nodes performs the process of sending a TP frame in a shortened period also when it has received a TP frame sent from an RPR node whose validity information of the entry in the TDB is invalid.

Most of a large number of TP frames which an RPR node receive immediately after the sequence starts to cut back are TP frames which are required to be analyzed by topology analysis processor 620. However, those TP frames cannot be analyzed altogether. Rather, while a certain TP frame is being analyzed, the other TP frames are temporarily stored in analysis processing queue 610.

If the RPR node receives a TP frame which is identical to one of the TP frames stored in analysis processing queue 610 at this time, then since the TP frame has not yet been analyzed, the contents of TDB 5700 have not been updated. Therefore, TP frame analysis processor 6000 judges the TP frame as a TP frame that needs to be analyzed though the TP frame is identical to one of the stored TP frames, and stores the TP frame into analysis processing queue 610.

As a result, the burden on topology analysis processor 620 increases, tending to store other identical TP frames into analysis processing queue 610.

As the number of TP frames to be analyzed increases to the extent that analysis processing queue 610 overflows, TP frames which really need to be analyzed cannot be stored in analysis processing queue 610 and will be discarded.

After a given period of time elapses in the circumstances, when the contents of the TDB of the RPR node and the contents of the TDBs of the adjacent RPR nodes are compared with each other, they are not in conformity with each other. Accordingly, it is necessary to carry out again the process of determining the topological state of the RPR network.

As it is confirmed whether the contents of the TDB of the RPR node and the contents of the TDBs of the adjacent RPR nodes are in conformity with each other or not after elapse of the given period of time, the time at which to resume communications is delayed.

Furthermore, since TP frames that have been analyzed are generally expected to be different between RPR nodes, it is highly possible that the process of confirming the topological states as recognized by the RPR node and the adjacent RPR nodes will be performed again many times at many locations in the RPR network.

If the topological state is not determined, the process of determining the topological state is interrupted. As a result, the transmission of data frames is not resumed, and the RPR network is shut down.

As the number of RPR nodes making up the RPR network increases, the number of TP frames that are sent when the sequence cuts back also increases, tending to aggravate the above problem.

The simplest way of solving the above problem would be to analyze TP frames with a high-speed processor. However, this approach would greatly impair the merit of the low cost of the Ethernet.

SUMMARY OF THE INVENTION

It is an object of the present invention to provide a network nod, a communication system, a method of changing states in a network node, and a recording medium which are highly reliable and capable of shortening a communication cutoff time when cutting back from an abnormal state to a normal state while retaining the advantages of the Ethernet.

To achieve the above object, there is provided in accordance with an aspect of the present invention a network node for a dual ring network for bidirectionally transferring communication frames as packets storing information to be sent and received, comprising a database for storing information representative of a topological state of the dual ring network, a frame analyzer for identifying a topological information management frame among the communication frames sent from other network nodes than the network node of the dual ring network, a topology frame analysis processor for classifying and outputting the topological information management frame identified by the frame analyzer, a topology analysis processor for analyzing the topological state of the dual ring network based on contents of the topological information management frame output from the topology frame analysis processor, and a database updating processor for updating the information stored in the database based on an analysis of the topological state performed by the topology analysis processor, wherein the topology frame analysis processor updates the information stored in the database based on the contents of the topological information management frame depending on a classification of the topological information management frame.

According to another aspect of the present invention, there is provided a communication system comprising a plurality of network nodes each constructed as described above, wherein the network nodes are interconnected in a dual ring network.

According to still another aspect of the present invention, there is provided a method of changing a state of a network node for a dual ring network for bidirectionally transferring communication frames as packets storing information to be sent and received, comprising the steps of identifying a topological information management frame among the communication frames sent from other network nodes than the network node of the dual ring network, comparing an identification number stored in the identified topological information management with an identification number, stored in a database of the network node, of a source network node which has sent the topological information management frame, and if the identification number stored in the identified topological information management and the identification number, stored in the database of the network node, of the source network node are in conformity with each other, and also if validity information, stored in the database, indicative of validity of the source network node is invalid, updating the validity information into valid validity information.

According to yet another aspect of the present invention, there is provided a recording medium recording therein a program for enabling a network node for a dual ring network for bidirectionally transferring communication frames as packets storing information to be sent and received, to perform a process of identifying a topological information management frame among the communication frames sent from other network nodes than the network node of the dual ring network, a process of comparing an identification number stored in the identified topological information management with an identification number, stored in a database of the network node, of a source network node which has sent the topological information management frame, and if the identification number stored in the identified topological information management and the identification number, stored in the database of the network node, of the source network node are in conformity with each other, and also if validity information, stored in the database, indicative of validity of the source network node is invalid, a process of updating the validity information into valid validity information.

According to the present invention, the topological state of the dual ring network can be determined in a short period of time when it cuts back from an abnormal state to a normal state. Consequently, a period of time during which communication are cut off in the dual ring network in the cut-back process is shortened.

The above and other objects, features, and advantages of the present invention will become apparent from the following description with reference to the accompanying drawings which illustrate an example of the present invention.

BRIEF DESCRIPTION OF THE DRAWINGS

FIG. 7 is a diagram showing by way of example the contents of a ringlet 0 information database shown in FIG. 6;

FIG. 8 is a diagram showing by way of example the contents of a ringlet 1 information database shown in FIG. 6;

FIG. 15 is a diagram showing by way of example the contents of a ringlet 0 information database shown in FIG. 14;

FIG. 16 is a diagram showing by way of example the contents of a ringlet 1 information database shown in FIG. 14;

DESCRIPTION OF THE EXEMPLARY EMBODIMENTS

Figure 1:
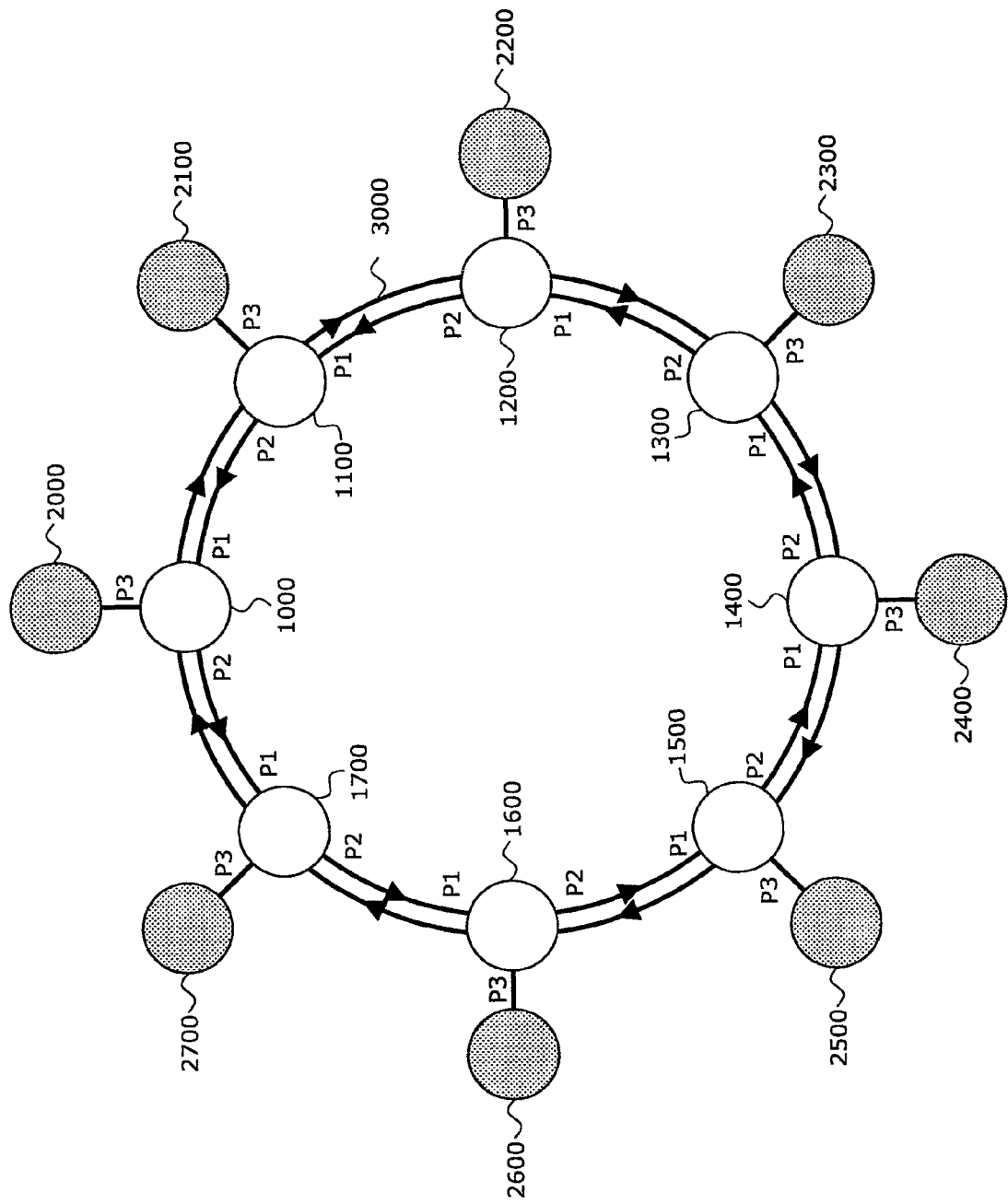
FIG. 1 is a diagram showing a communication system comprising a general RPR network.

Preferred exemplary embodiments of the present invention will be described in detail below with reference to the drawings. Those parts shown in the drawings to be described below which are denoted by reference characters that are identical to those used to denote parts described in the related art are operationally and structurally identical to those parts described in the related art.

1st Exemplary Embodiment (Configuration of the Communication System)

Figure 9:
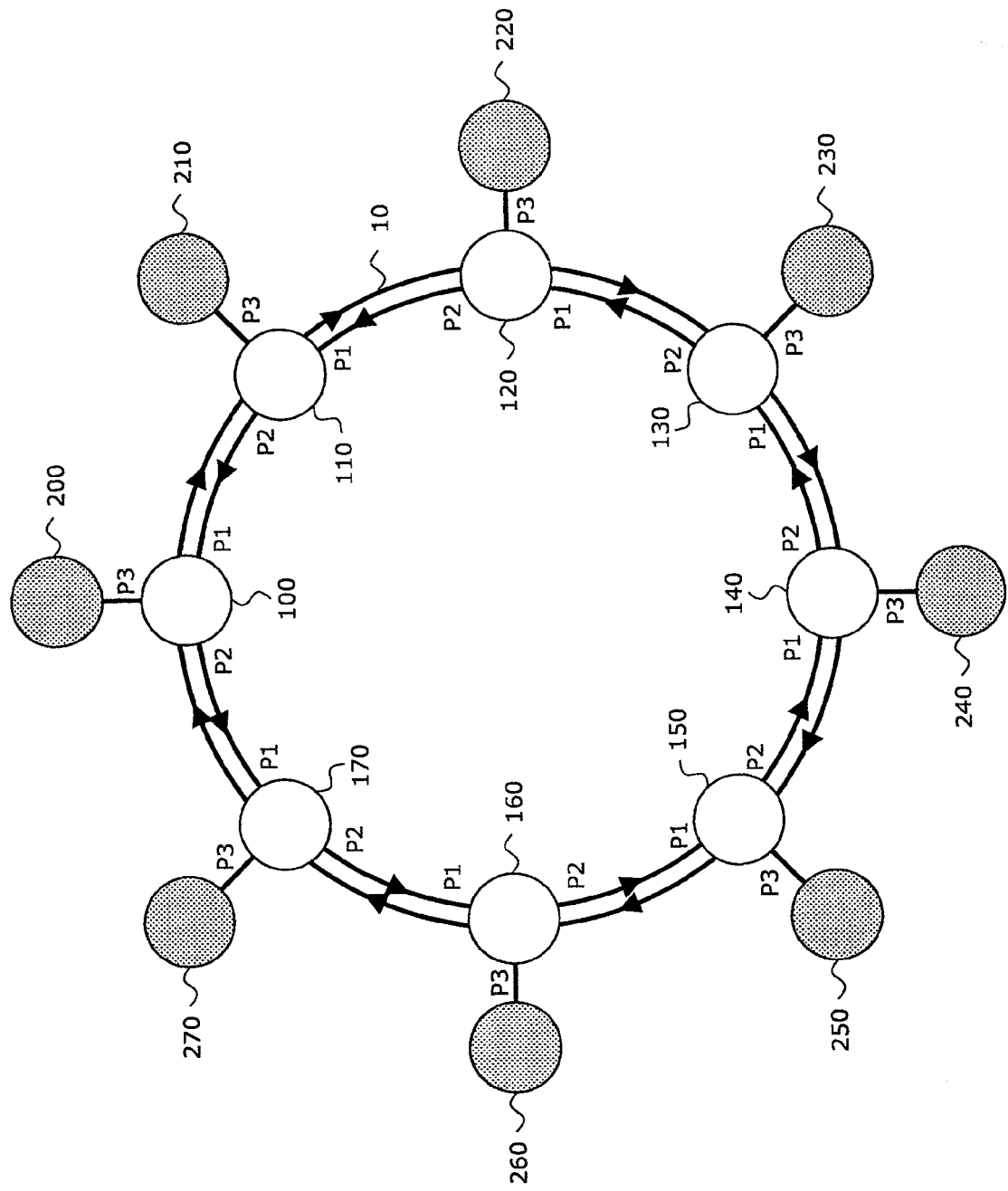
FIG. 9 is a diagram showing a communication system according to a first exemplary embodiment of the present invention.

FIG. 9 shows a communication system according to a first exemplary embodiment of the present invention which comprises RPR network 10 in the form of a dual ring network made up of eight nodes operable according to the RPR (hereinafter referred to as RPR nodes 100, 110, 120, 130, 140, 150, 160, 170) for performing bidirectional communications, and terminals 200, 210, 220, 230, 240, 250, 260, 270 accommodated respectively under RPR nodes 100, 110, 120, 130, 140, 150, 160, 170.

(Configuration of the RPR Node According to the 1st Exemplary Embodiment)

Figure 10:
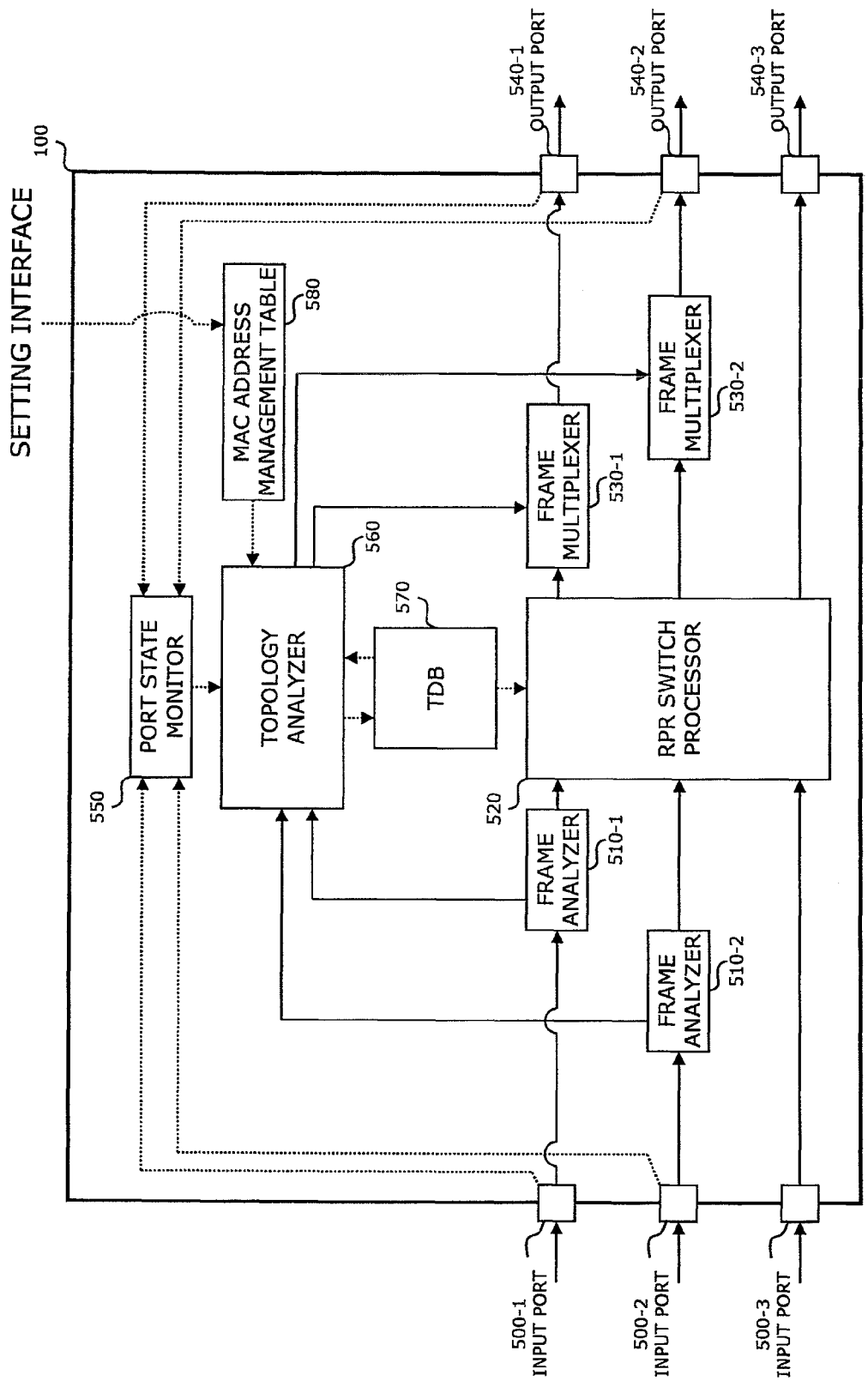
FIG. 10 is a block diagram of the node configuration of an RPR node of the communication system shown in FIG. 9.

Each of the RPR nodes according to the first exemplary embodiment is similar to the general RPR node as shown in FIG. 10.

As shown in FIG. 10, RPR node 100 comprises input ports 500-1 through 500-3, frame analyzers 510-1, 510-2, RPR switch processor 520, frame multiplexers 530-1, 530-2, output ports 540-1 through 540-3, port state monitor 550, topology analyzer 560, TDB 570, and MAC address management table 580.

Figure 4:
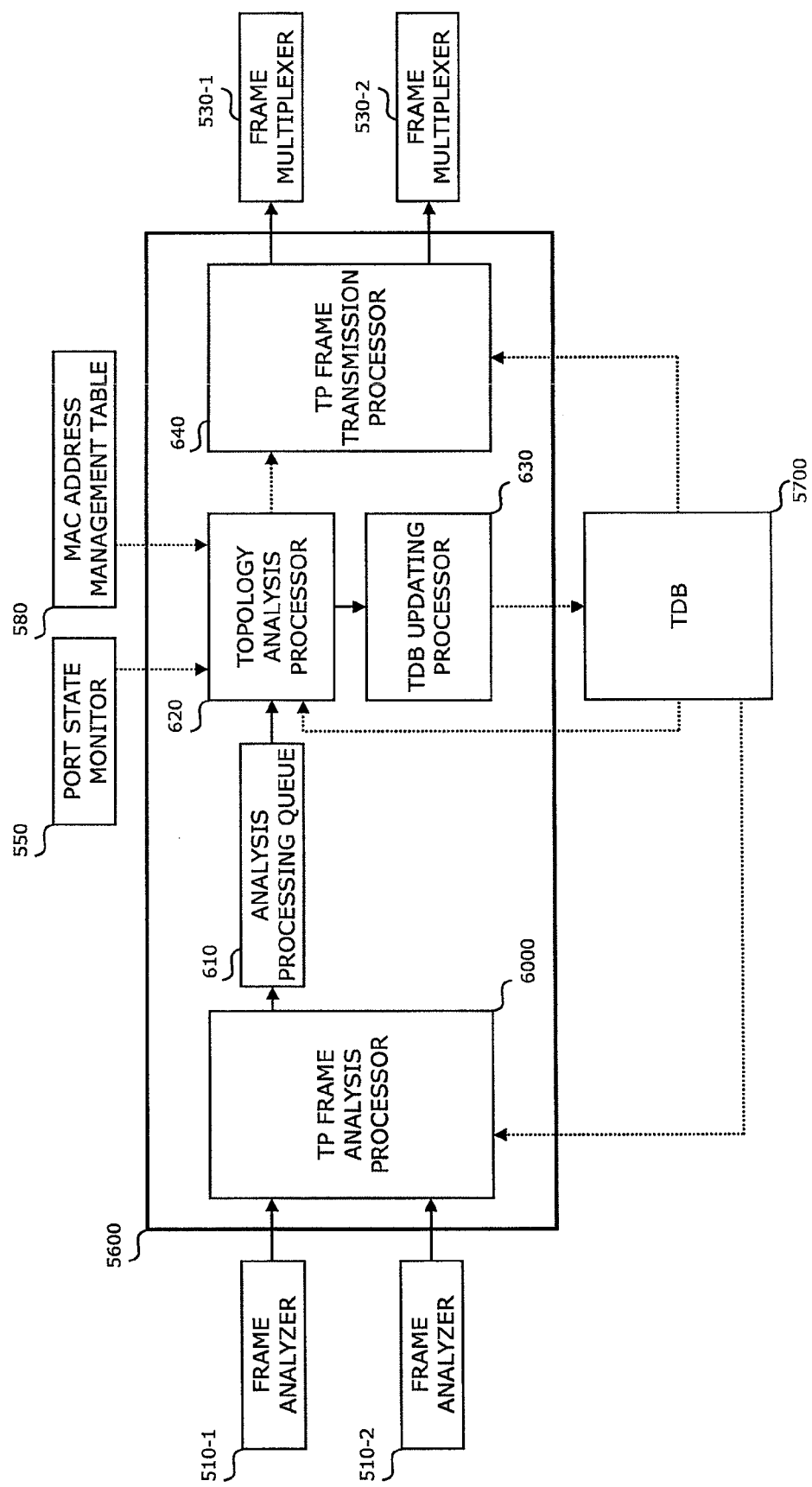
FIG. 4 is a block diagram showing the internal configuration of a topology analyzer shown in FIG. 2.
Figure 5:
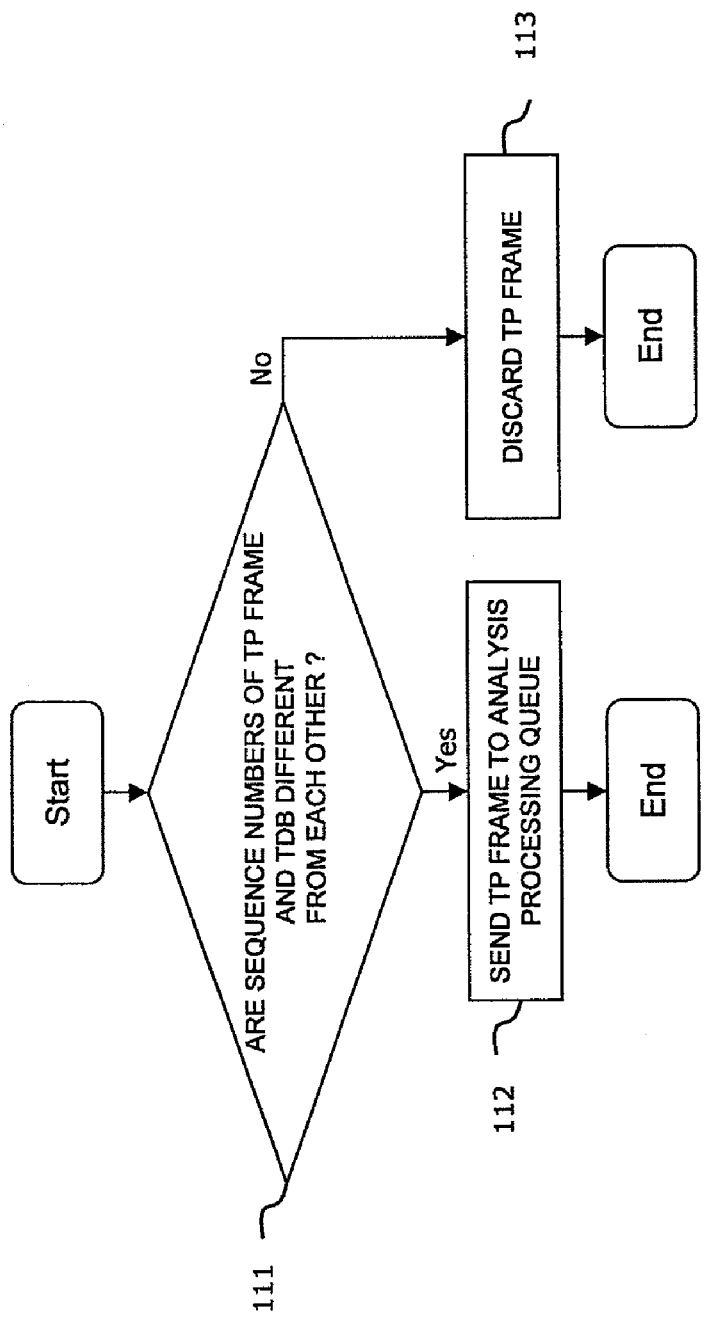
FIG. 5 is a flowchart of a processing sequence carried out by a TP frame analysis processor shown in FIG. 4.
Figure 11:
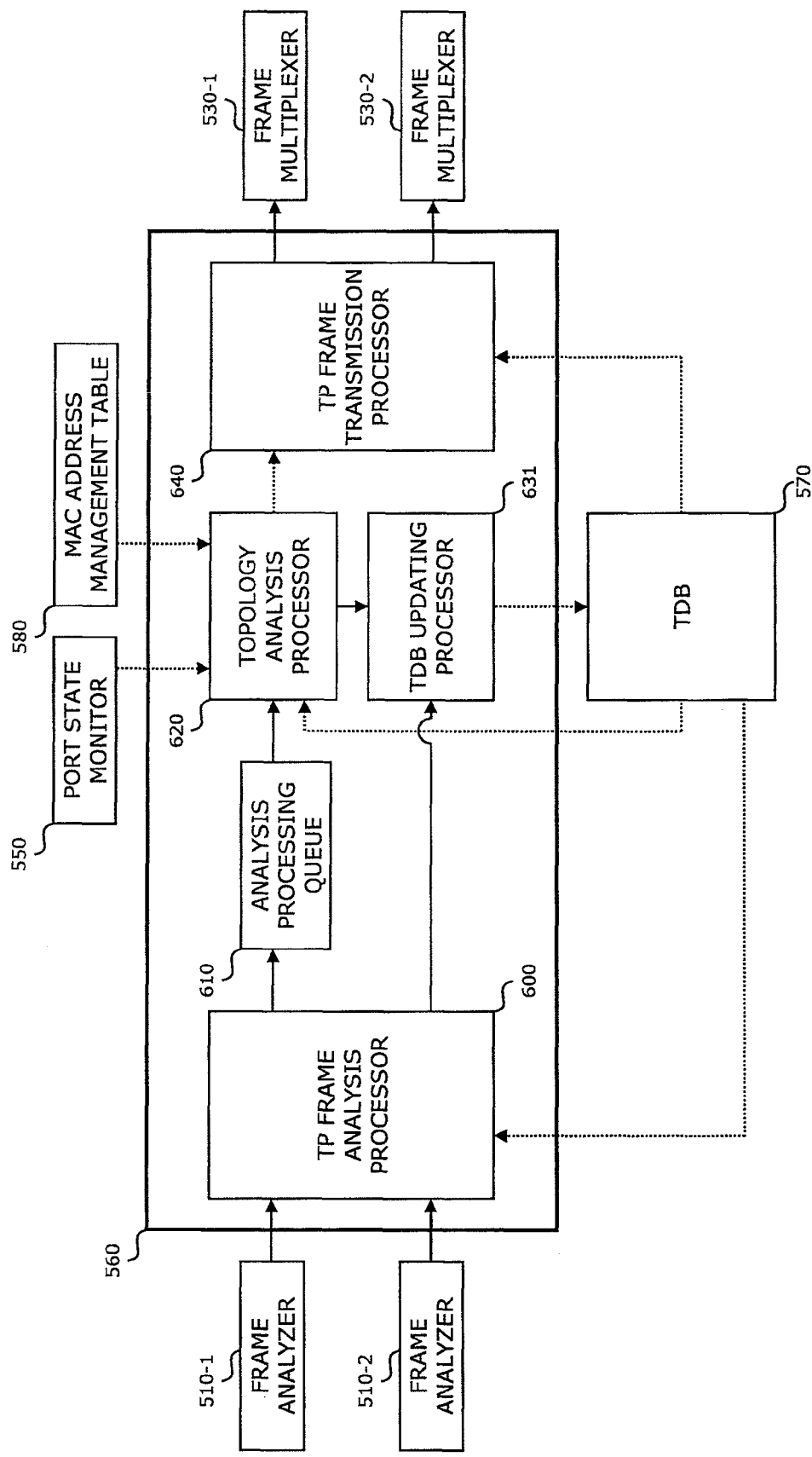
FIG. 11 is a block diagram showing the internal configuration of a topology analyzer shown in FIG. 10.

In the RPR node according to the first exemplary embodiment, topology analyzer 560 has a configuration shown in FIG. 11 which is different from topology analyzer 5600 that has the configuration shown in FIG. 4 for use in the general RPR node. TDB 570 shown in FIG. 10 is of the same configuration as TDB 5700 shown in FIG. 2. However, RPR node identifiers stored in an internal database of TDB 570 comprises the MAC addresses of RPR nodes 100, 110, 120, 130, 140, 150, 160, 170.

In topology analyzer 560 of the RPR node according to the present exemplary embodiment, TP frame analysis processor 600 has, in addition to the function of TP frame analysis processor 6000 shown in FIG. 4, an ability to directly instruct TDB updating processor 631 to update the contents of TDB 570 of the RPR node. Specifically, TDB updating processor 631 classifies received TP frames into first through third frames and performs processes depending on those frames. A method of classifying received TP frames will be described later. TDB updating processor 631 also serves as a database updating processor having, in addition to the function of TDB updating processor 630 shown in FIG. 4, an ability to update the contents of TDB 570 according to not only an instruction from topology analysis processor 620, but also a direct instruction from TP frame analysis processor 600.

Figure 12:
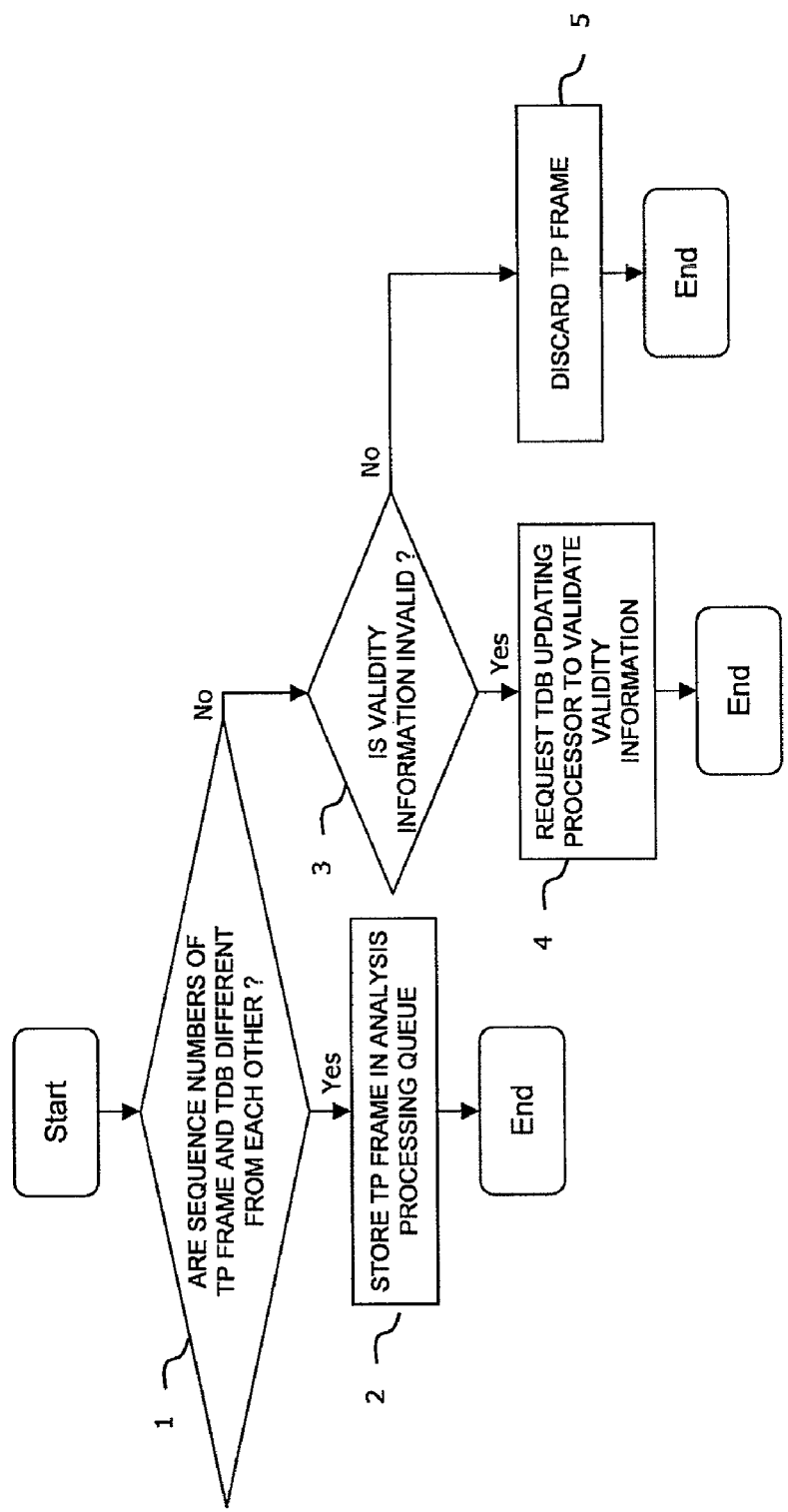
FIG. 12 is a flowchart of a TP frame analyzing process carried out by a TP frame analysis processor shown in FIG. 11.

(Cut-back Operation of the RPR Node According to the Present Exemplary Embodiment Operation of the RPR node according to the present exemplary embodiment which has the node configuration shown in FIGS. 10 and 11 in a cut-back process for recovering a link on the RPR network from a cutoff state will be described below with reference to a flowchart shown in FIG. 12 which represents a processing sequence carried out by TP frame analysis processor 600 of the RPR node.

When the RPR node receives a TP frame at the time the sequence cuts back, and frame analyzers 510-1, 510-2 send the TP frame to TP frame analysis processor 600, TP frame analysis processor 600 refers to TDB 570 of its own, and compares the sequence number stored as the identification number in the TP frame with the sequence number stored in TDB 570 as the identification number of the source RPR node which is the source network node that has sent the TP frame. If the compared sequence numbers are different from each other (Yes in step 1), then TP frame analysis processor 600 judges that the TP frame is the first frame referred to above and stores the TP frame into analysis processing queue 610 in step 2.

If the compared sequence numbers are the same as each other (No in step 1), then TP frame analysis processor 600 examines the validity information of the entry with respect to the source RPR node in TDB 570. If the validity information is invalid (Yes in step 3), then TP frame analysis processor 600 judges that the TP frame is the second frame referred to above and instructs TDB updating processor 631 to validate the validity information of the entry of the TP frame in step 4.

If the validity information is valid (No in step 3), then TP frame analysis processor 600 judges that the TP frame is the third frame referred to above and discards the TP frame.

According to the above processing sequence, with respect to a TP frame whose sequence number has not changed but whose validity information needs to be validated, TP frame analysis processor 600 directly instructs TDB updating processor 631 to validate the validity information of the entry of the TP frame in TEB 570, without intervention by analysis processing queue 610 and topology analysis processor 620. Accordingly, the burden on topology analysis processor 620 is reduced, and the contents of TDB 570 can quickly be updated. The time required to determine the topological state of the RPR network can thus be shortened.

With the burden on topology analysis processor 620 being reduced, TP frames are prevented from being discarded by an overflow of analysis processing queue 610. Since the timings with which the contents of the TDBS of RPR nodes are brought into conformity with each other are prevented from being different from each other, the transmission of data frames can be resumed early.

According to the first exemplary embodiment, as described above, inasmuch as the time required to determine the topological state of the RPR network can be shortened, the RPR network is highly reliable in that the period of time during which communications are broken at the time the sequence cuts back is shortened.

2nd Exemplary Embodiment (Configuration of the Communication System)

A communication system according to a second exemplary embodiment of the present invention has a configuration which is essentially the same as the configuration of the communication system according to the first exemplary embodiment, as shown in FIG. 9.

(Configuration of the RPR Node According to the 2nd Exemplary Embodiment)

Each of the RPR nodes according to the second exemplary embodiment is similar to the RPR node according to the first exemplary embodiment, as shown in FIG. 10.

Figure 13:
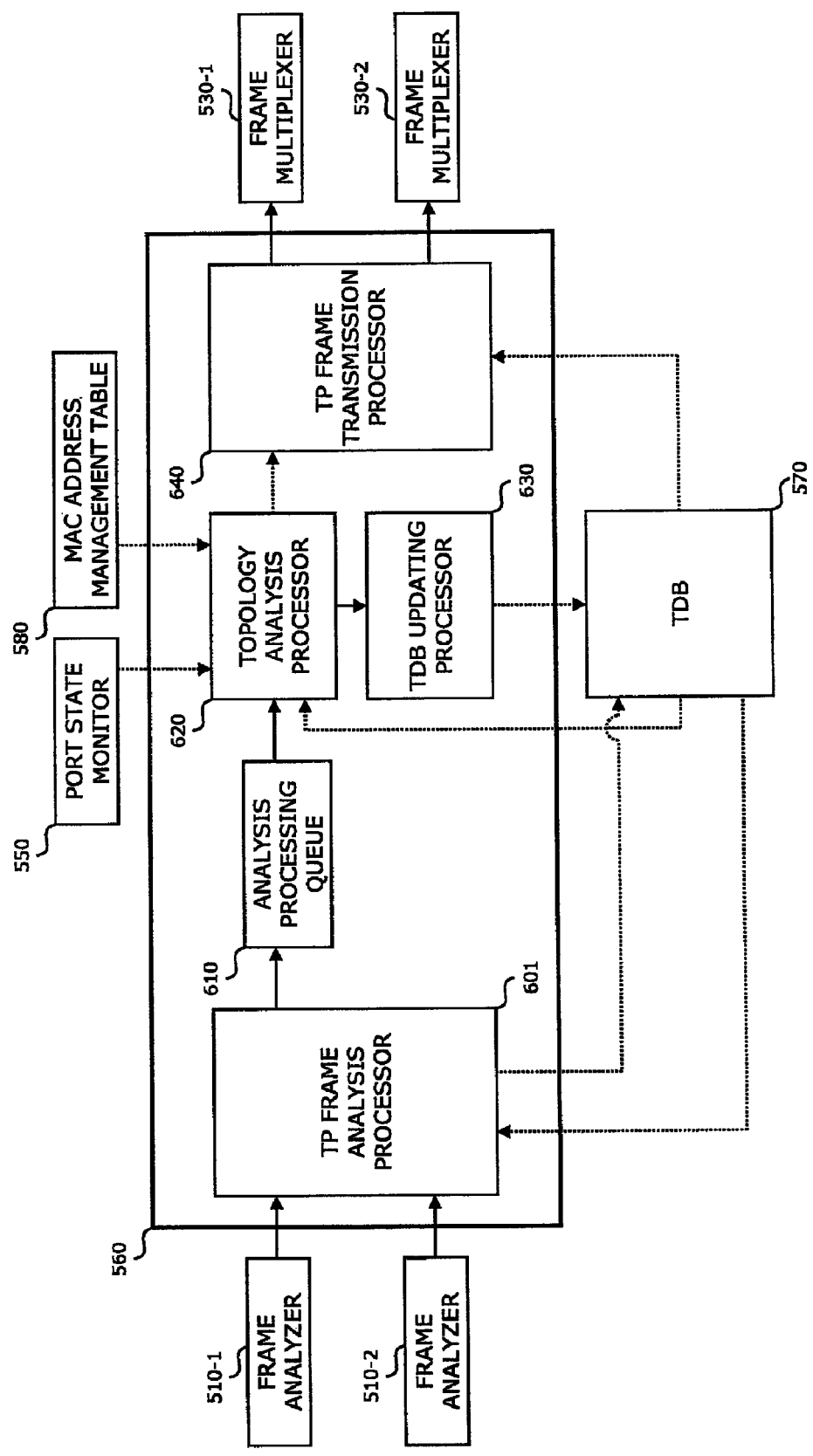
FIG. 13 is a block diagram showing the configuration of a topology analyzer according to a second exemplary embodiment of the present invention.

However, the RPR node according to the second exemplary embodiment has topology analyzer 560 having a configuration shown in FIG. 13 which is different from the configuration of topology analyzer 560 according to the first exemplary embodiment shown in FIG. 11. Topology analyzer 560 shown in FIG. 13 has TDB updating processor 630 which is of general nature as shown in FIG. 4.

In topology analyzer 560 of the RPR node according to the present exemplary embodiment, TP (topology) frame analysis processor 601 is capable of directly updating the contents of TDB 570.

Figure 6:
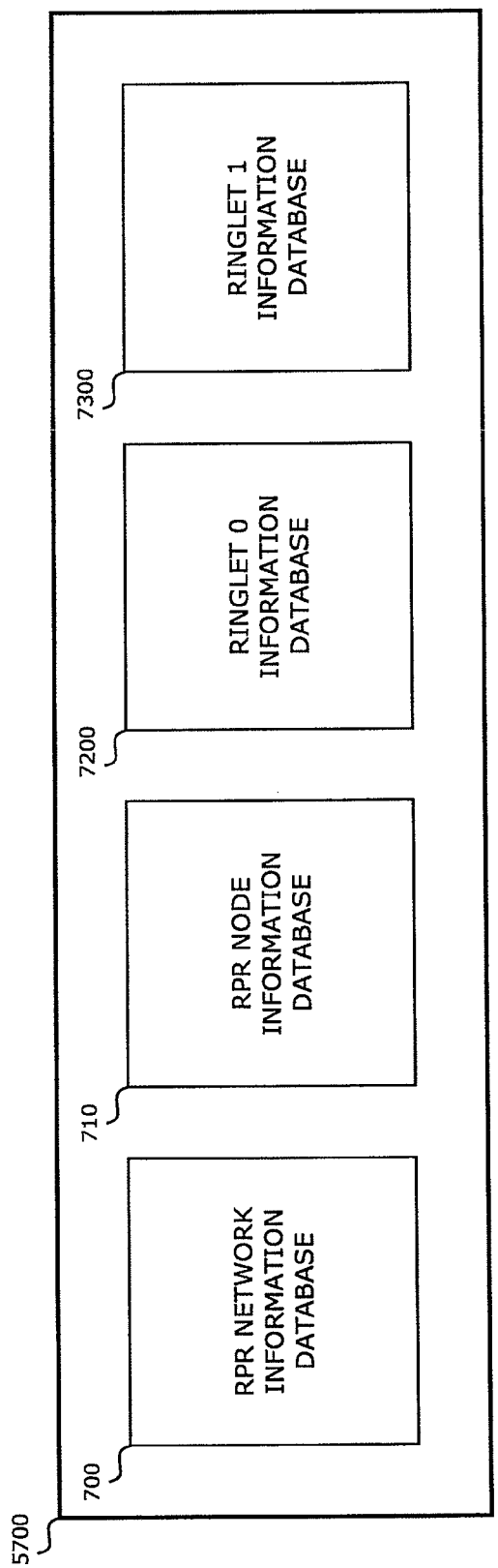
FIG. 6 is a block diagram showing the internal configuration of a TDB shown in FIG. 2.
Figure 14:
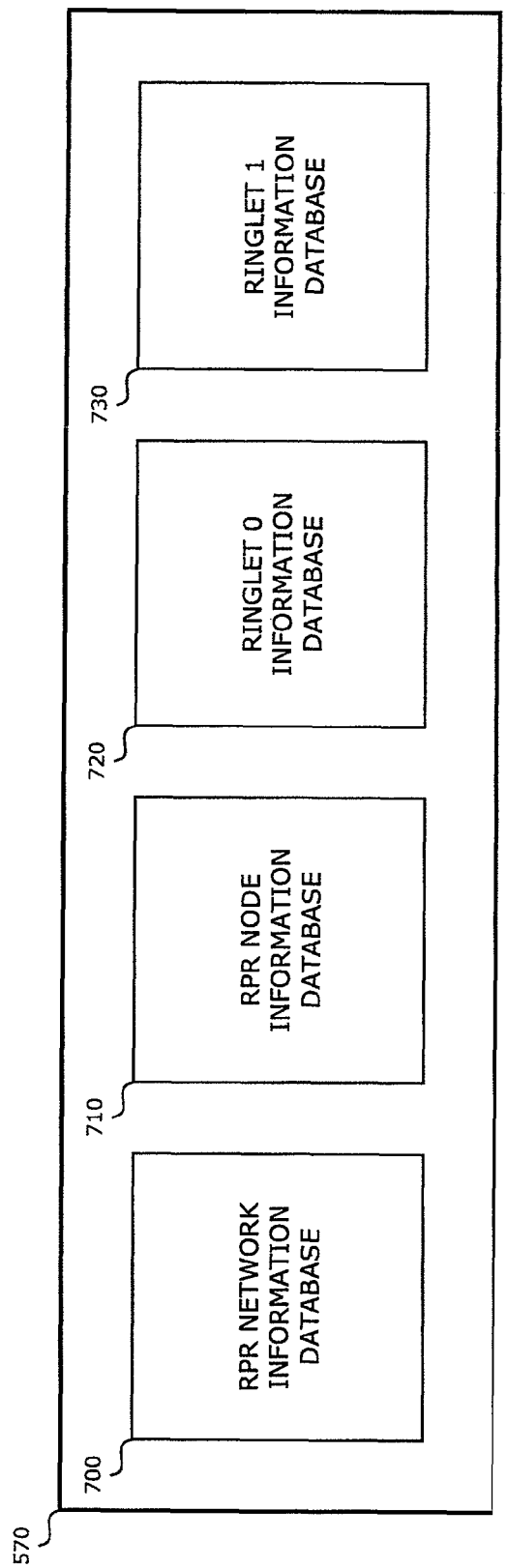
FIG. 14 is a block diagram showing the internal configuration of a TDB shown in FIG. 13.

TDB 570 has an internal structure shown in FIG. 14 which is different from the internal structure of TDB 5700 shown in FIG. 6. TDB 570 includes, in addition to RPR network information database 700 and RPR node information database 710, ringlet 0 information database 720 and ringlet 1 information database 730 shown respectively in FIGS. 15 and 16 which are different from those of the RPR node according to the first exemplary embodiment.

Ringlet 0 information database 720 and ringlet 1 information database 730 of the RPR node according to the second exemplary embodiment are different from those of the RPR node according to the first exemplary embodiment in that they are capable of storing provisional validity information which corresponds to the validity information and has the same meaning as the validity information. The provisional validity information can directly be updated by TP frame analysis processor 601.

(Operation of the RPR Node According to the Present Exemplary Embodiment in the Event of a Failure)

The RPR node according to the related art invalidates the ringlet 0 information database and the ringlet 1 information database in the event of a failure. The RPR node according to the present exemplary embodiment also invalidates the provisional validity information of an invalidated entry.

Operation of the RPR node according to the present exemplary embodiment in the event of a failure is the same as operation of the general RPR node described in the related art except for a process of invalidating the provisional validity information.

(Cut-back Operation of the RPR Node According to the Present Exemplary Embodiment)

Figure 17:
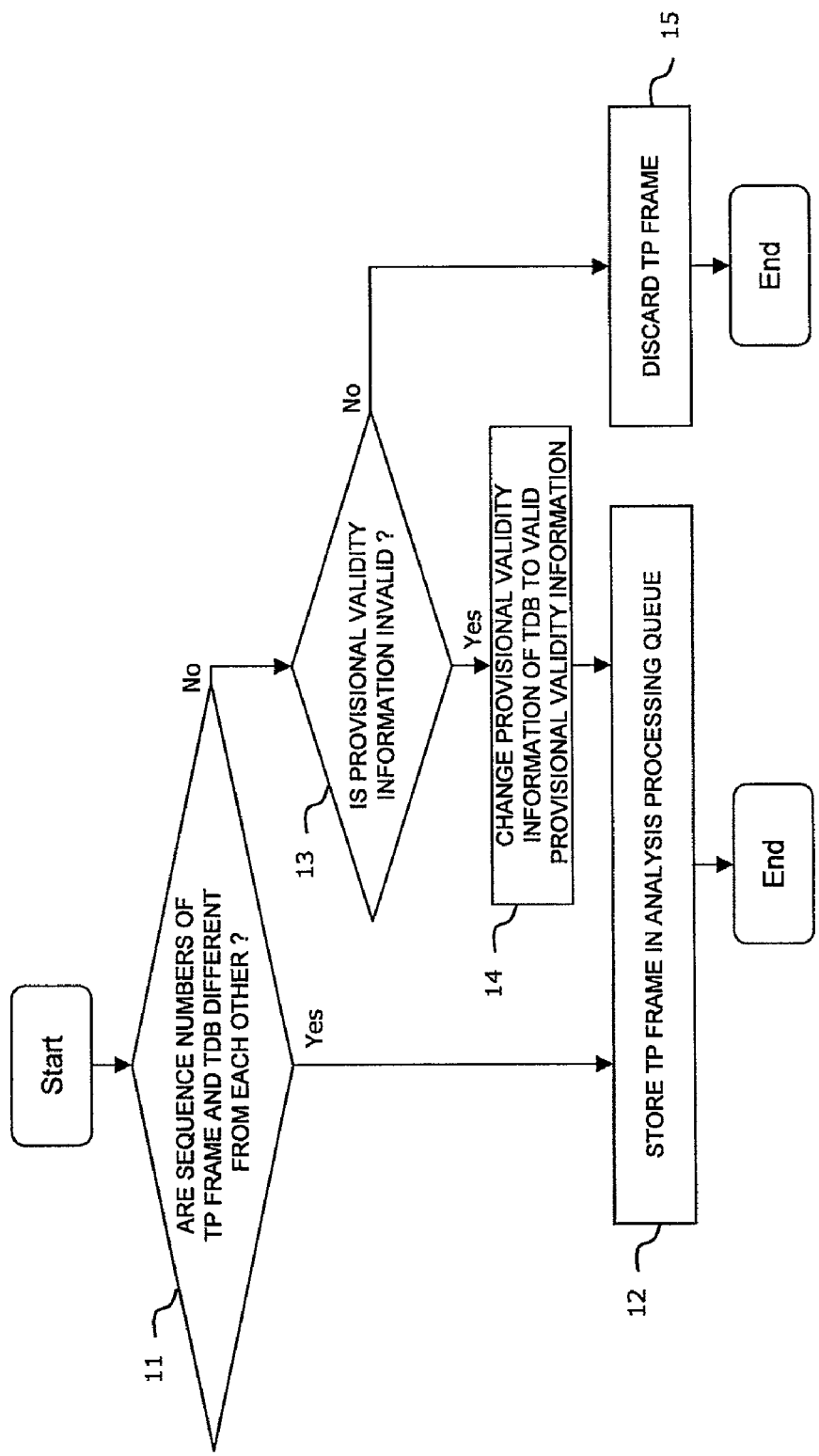
FIG. 17 is a flowchart of a TP frame analyzing process carried out by a TP frame analysis processor shown in FIG. 13.

Operation of the RPR node according to the present exemplary embodiment which has the node configuration shown in FIGS. 10 and 13 in a cut-back process for recovering a link on the RPR network from a cutoff state will be described below with reference to a flowchart shown in FIG. 17 which represents a processing sequence carried out by TP frame analysis processor 601 of the RPR node.

When the RPR node receives a TP frame at the time the sequence cuts back, and frame analyzers 510-1, 510-2 send the TP frame to TP frame analysis processor 601, TP frame analysis processor 601 refers to ringlet 0 information database 720 or ringlet 1 information database 730 in TDB 570 of its own, and compares the sequence number stored in the TP frame with the sequence number stored in TDB 570 as indicating the source RPR node which has sent the TP frame. If the compared sequence numbers are different from each other (Yes in step 11), then TP frame analysis processor 601 stores the TP frame into analysis processing queue 610 in step 12.

If the compared sequence numbers are the same as each other (No in step 11), then TP frame analysis processor 601 examines the provisional validity information of the entry with respect to the source RPR node in TDB 570. If the provisional validity information is invalid (Yes in step 13), then TP frame analysis processor 601 validates the provisional validity information of the entry in step 14, and then stores the TP frame into analysis processing queue 610 in step 12.

If the provisional validity information is valid (No in step 13), then TP frame analysis processor 601 discards the TP frame in step 15.

According to the above processing sequence, the process of updating TDB 570 under the instruction from TP frame analysis processor 601 and the process of updating TDB 570 under the instruction from topology analysis processor 620 overlap each other in TDB updating processor 630. Therefore, the process of updating TDB 570 is prevented from being delayed.

The information (provisional validity information) referred to or changed by TP frame analysis processor 601 and the information (validity information) changed by TDB updating processor 630 are separate from each other. Accordingly, TDB updating processor 630 and TP frame analysis processor 601 can simultaneously access TDB 570. The time required to update TDB 570 can thus be shortened.

According to the present exemplary embodiment, the provisional validity information is introduced to allow the validity information of the entries of the TDB to be updated quickly. Therefore, the time required to determine the topological state of the RPR network can be shortened.

3rd Exemplary Embodiment (Configuration of the Communication System)

A communication system according to a third exemplary embodiment of the present invention has a configuration which is essentially the same as the configuration of the communication systems according to the first and second exemplary embodiments, as shown in FIG. 9.

(Configuration of the RPR Node According to the 3rd Exemplary Embodiment)

Figure 2:
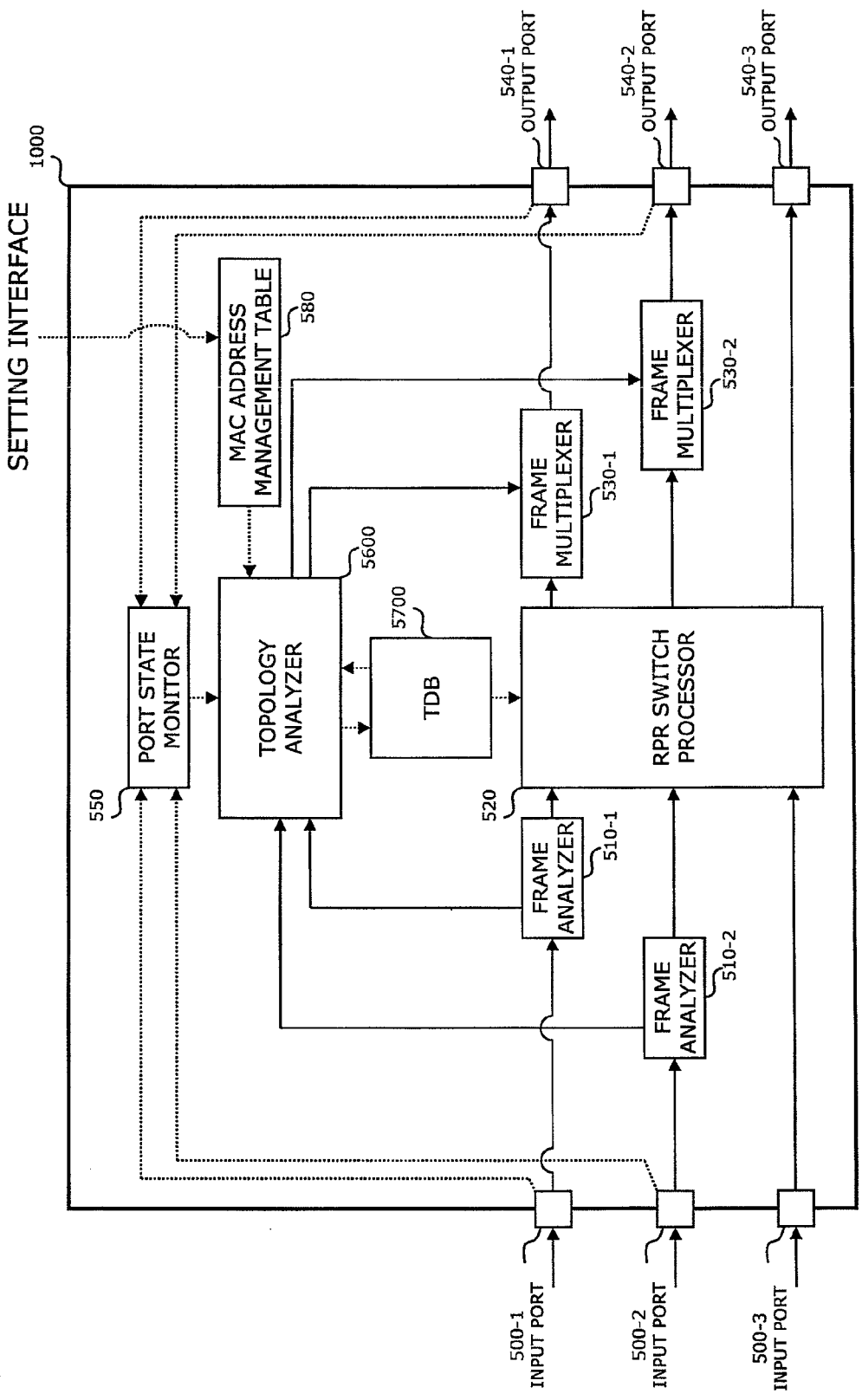
FIG. 2 is a block diagram of the node configuration of an RPR node of the communication system shown in FIG. 1.
Figure 3:
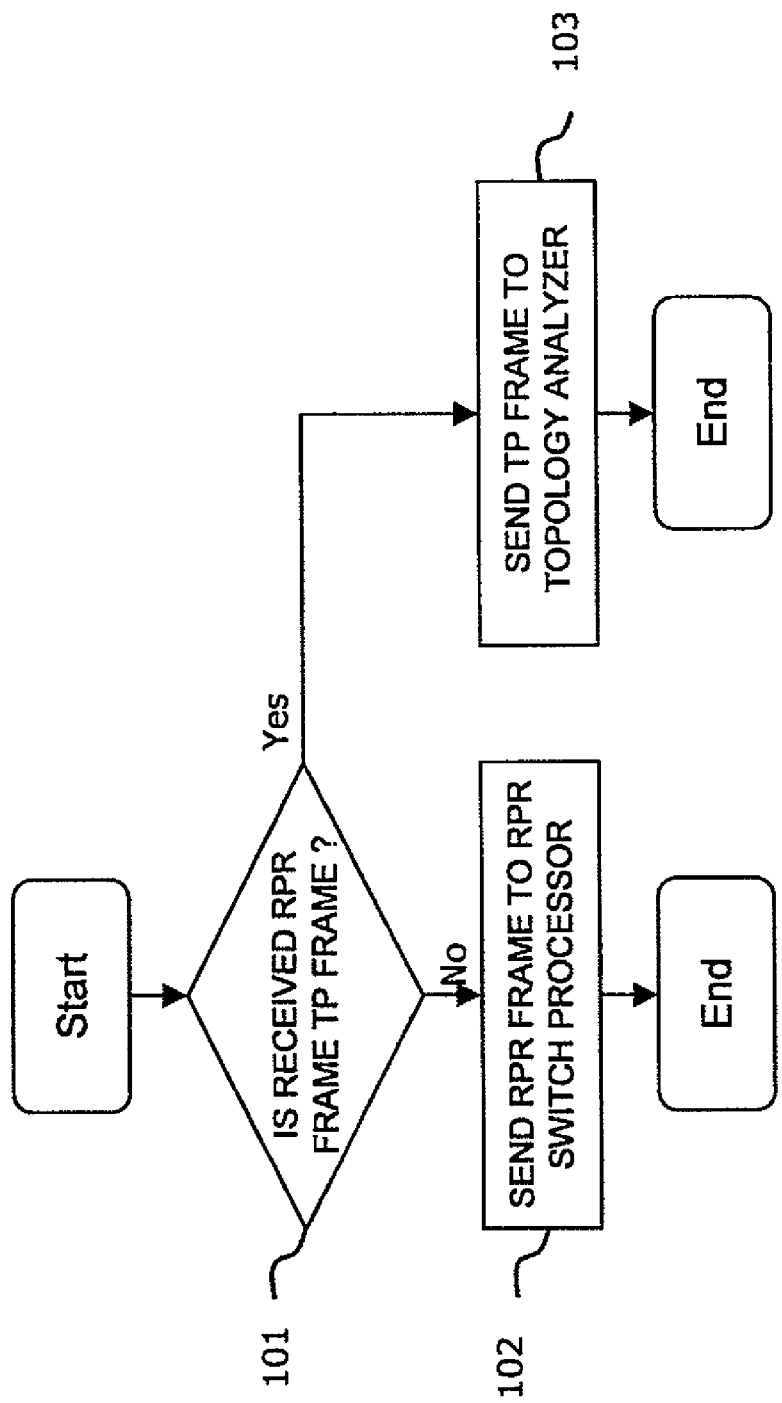
FIG. 3 is a flowchart of a processing sequence carried out by a frame analyzer shown in FIG. 2.
Figure 18:
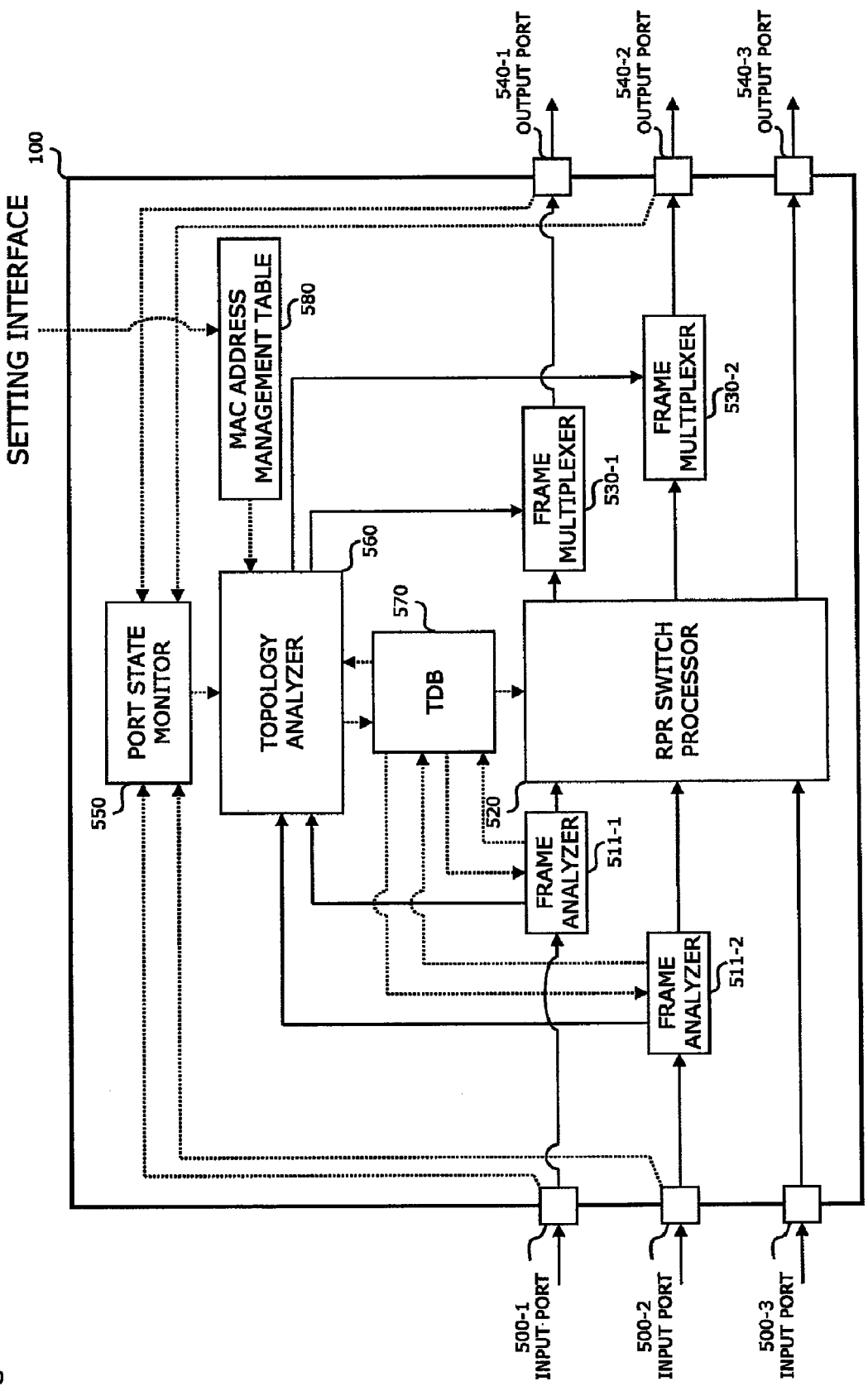
FIG. 18 is a block diagram of the node configuration of an RPR node according to a third exemplary embodiment of the present invention.

As shown in FIG. 18, each of the RPR nodes according to the third exemplary embodiment is different from the RPR node shown in FIG. 2 in that frame analyzers 511-1, 511-2 has, in addition to the function of frame analyzers 501-1, 501-2 shown in FIG. 2, an ability to directly refer to and update TDB 570.

Topology analyzer 560 of the RPR node according to the present exemplary embodiment has a block configuration which is the same as the configuration of the RPR node according to the first exemplary embodiment shown in FIG. 11.

Ringlet 0 information database 720, and ringlet 1 information database 730 of the RPR node according to the present exemplary embodiment have a configuration which is the same as the configuration of the corresponding databases of the RPR node according to the second exemplary embodiment shown in FIGS. 15 and 16.

(Operation of the RPR Node According to the Present Exemplary Embodiment in the Event of a Failure)

Operation of the RPR node according to the present exemplary embodiment in the event of a failure is the same as operation of the RPR node according to the second exemplary embodiment except that the process of invalidating the validity information and the process of invalidating the provisional validity information are carried out together, as is the case with the RPR node according to the second exemplary embodiment.

(Cut-back Operation of the RPR Node According to the Present Exemplary Embodiment)

Figure 19:
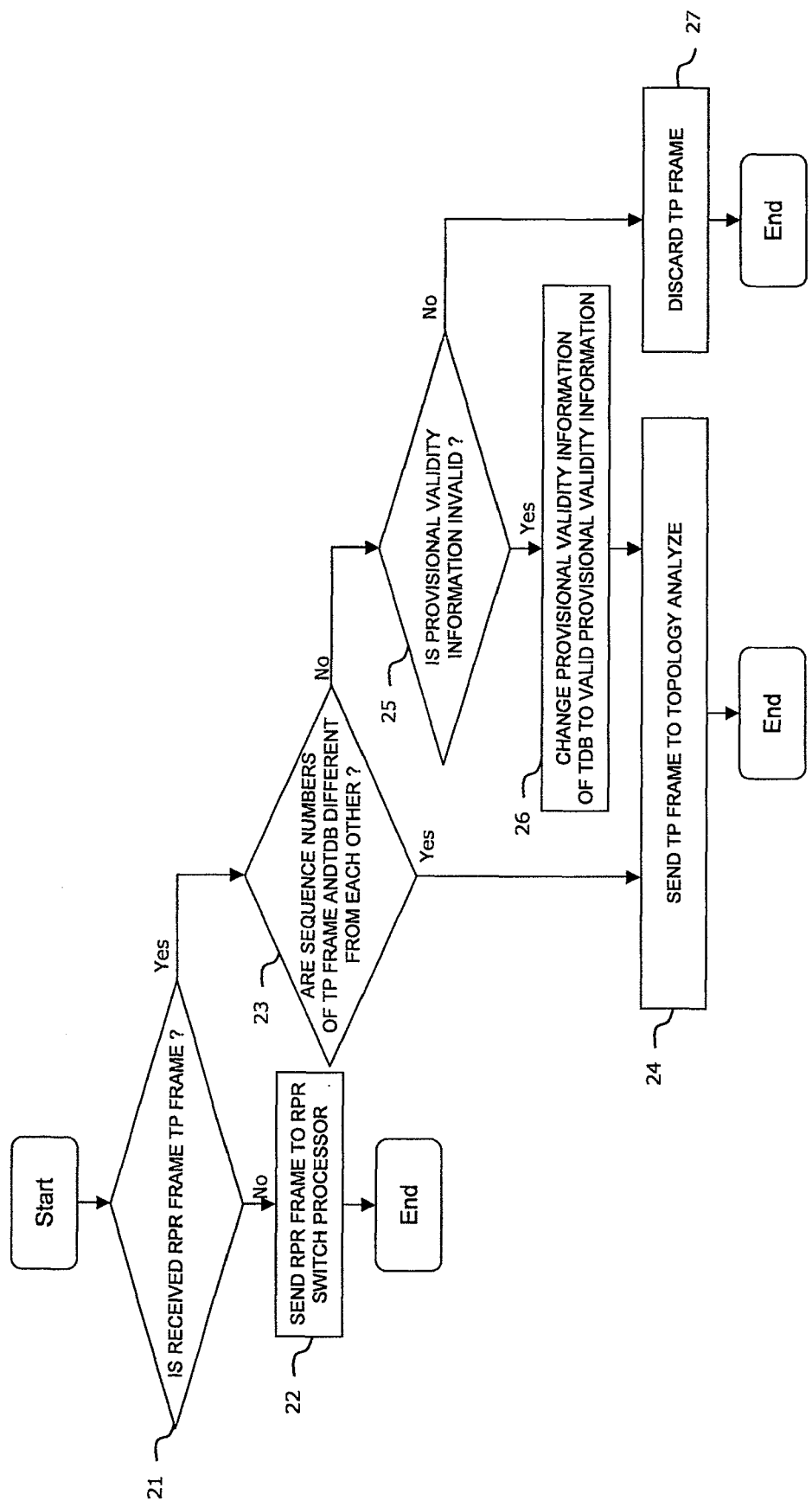
FIG. 19 is a flowchart of a frame analyzing process carried out by a frame analyzer shown in FIG. 18.

Operation of the RPR node according to the present exemplary embodiment which has the node configuration shown in FIGS. 10 and 18 in a cut-back process for recovering a link on the RPR network from a cutoff state will be described below with reference to a flowchart shown in FIG. 19 which represents a processing sequence carried out by frame analyzers 511-1, 511-2 of the RPR node.

When the RPR node receives an RPR frame at the time the sequence cuts back, frame analyzers 511-1, 511-2 send the TP frame to RPR switch processor 520 in step 22 if the RPR frame is not a TP frame (No in step 21).

If the RPR frame is a TP frame (Yes in step 21), then frame analyzers 511-1, 511-2 refer to ringlet 0 information database 720 or ringlet 1 information database 730 in TDB 570 of their own, and compare the sequence number stored in the TP frame with the sequence number stored in TDB 570 as indicating the source RPR node which has sent the TP frame. If the compared sequence numbers are different from each other (Yes in step 23), then frame analyzers 511-1, 511-2 send the TP frame to topology analyzer 560 in step 24.

If the compared sequence numbers are the same as each other (No in step 23), then frame analyzers 511-1, 511-2 examine the provisional validity information of the entry with respect to the source RPR node in TDB 570. If the provisional validity information is invalid (Yes in step 25), then frame analyzers 511-1, 511-2 validate the provisional validity information of the entry in step 26, and the TP frame to topology analyzer 560 in step 24.

Subsequent operation of topology analyzer 560 is the same as the operation described above in the first exemplary embodiment.

If the provisional validity information is valid (No in step 25), then frame analyzers 511-1, 511-2 discard the TP frame in step 27.

According to the above processing sequence, the process carried out by TP frame analysis processor 601 of topology analyzer 560 of the RPR node according to the second exemplary embodiment is performed by frame analyzers 511-1, 511-2.

The process called Topology Discovery Protocol which is carried out by topology analyzer 560 is so complex that it is usually installed as a software process in the network node.

However, although the software-implemented process is flexible, it is generally executed at a lower rate than if it is hardware-implemented.

The above problem can be solved to a certain extent if the relatively simple process which has heretofore been carried out by TP frame analysis processor 600 is hardware-implemented.

Frame analyzers 511-1, 511-2 are often hardware-implemented because they need to process a large traffic of data. It is thus relatively easy to perform the process of frame analyzers 511-1, 511-2 by way of hardware implementation.

According to the present exemplary embodiment, as described above, the process of analyzing TP frames, which is included in the process of analyzing the topological state, is separated, and the node configuration is designed to make it easy to perform the process of analyzing TP frames by way of hardware implementation. In this manner, the burden on the process of analyzing the topological state is reduced, and the time required to update TDB 570 is shortened. Consequently, the period of time during which communications are broken at the time the sequence cuts back is shortened.

In the present exemplary embodiment, TP frame analysis processor 600 of the RPR node may be dispensed with, and all TP frames sent from frame analyzers 511-1, 511-2 may be stored in analysis processing queue 610. Such an arrangement is effective to simplify the node configuration though the burden on topology analysis processor 620 is slightly increased.

In each of the above exemplary embodiments, each RPR node includes various processors including the topology analyzer. However, each RPR node may have a computer and a recording medium, and the computer may operate according to an RPR node program stored in the recording medium to realize the operations of the above processors. The recording medium may comprise a removable recording medium such as a floppy disk (registered trademark), a magnetooptical disk, a DVD, a CD, or the like, or an HDD or the like installed in the RPR node.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A network node for a dual ring network for bidirectionally transferring communication frames as packets storing information to be sent and received, comprising:
   a database for storing information representative of a topological state of the dual ring network;
   a frame analyzer for identifying a topological information management frame among the communication frames sent from other network nodes than said network node of the dual ring network;
   a topology frame analysis processor for classifying and outputting the topological information management frame identified by said frame analyzer;
   a topology analysis processor for analyzing the topological state of the dual ring network based on contents of said topological information management frame output from said topology frame analysis processor; and a database updating processor for updating the information stored in said database based on an analysis of said topological state performed by said topology analysis processor;

wherein said topology frame analysis processor updates the information stored in said database based on the contents of said topological information management frame depending on a classification of said topological information management frame;

wherein said topology frame analysis processor instructs said database updating processor to update the information stored in said database depending on the classification of said topological information management frame;

said database updating processor updates the information stored in said database based on an instruction from said topology frame analysis processor;

wherein if an identification number stored in said topological information management frame and an identification number, stored in said database, of a source network node which has sent the topological information management frame are in conformity with each other, and also if validity information, stored in said database, indicative of validity of said source network node is invalid, then said topology frame analysis processor instructs said database updating processor to update said validity information into valid validity information;

wherein said topology frame analysis processor directly updates the information stored in said database depending on the classification of said topological information management frame;

wherein said database stores provisional validity information which corresponds to validity information, stored in said database, indicative of validity of a source network node which has sent the topological information management frame, said provisional validity information being updatable by said topology frame analysis processor; and if an identification number stored in said topological information management frame and an identification number, stored in said database, of said source network node are in conformity with each other, and also if the provisional validity information stored in said database, of said source network node is invalid, then said topology frame analysis processor updates said provisional validity information into valid provisional validity information, and outputs said topological information management frame to said topology analysis processor.

2. A network node for a dual ring network for bidirectionally transferring communication frames as packets storing information to be sent and received, comprising:

a database for storing information representative of a topological state of the dual ring network;

a frame analyzer for identifying a topological information management frame among the communication frames sent from other network nodes than said network node of the dual ring network;

a topology frame analysis processor for classifying and outputting the topological information management frame identified by said frame analyzer;

a topology analysis processor for analyzing the topological state of the dual ring network based on contents of said topological information management frame output from said topology frame analysis processor; and a database updating processor for updating the information stored in said database based on an analysis of said topological state performed by said topology analysis processor;

wherein said topology frame analysis processor updates the information stored in said database based on the contents of said topological information management frame depending on a classification of said topological information management frame;

wherein said topology frame analysis processor instructs said database updating processor to update the information stored in said database depending on the classification of said topological information management frame;

said database updating processor updates the information stored in said database based on an instruction from said topology frame analysis processor;

wherein if an identification number stored in said topological information management frame and an identification number, stored in said database, of a source network node which has sent the topological information management frame are in conformity with each other, and also if validity information, stored in said database, indicative of validity of said source network node is invalid, then said topology frame analysis processor instructs said database updating processor to update said validity information into valid validity information;

wherein said frame analyzer analyzes said topological information management frame, and updates the information stored in said database depending on an analysis of the topological information management frame;

wherein said database stores provisional validity information which corresponds to validity information, stored in said database, indicative of validity of a source network node which has sent the topological information management frame, said provisional validity information being updatable by said frame analyzer; and if an identification number stored in said topological information management frame and an identification number, stored in said database, of said source network node are in conformity with each other, and also if the provisional validity information, stored in said database, of said source network node is invalid, then said frame analyzer updates said provisional validity information into valid provisional validity information, and outputs said topological information management frame to said topology frame analysis processor.

3. A communication system comprising a plurality of network nodes each according to any one of claims 1 and 2, wherein said network nodes are interconnected in a dual ring network.

4. A method of changing a state of a network node for a dual ring network for bidirectionally transferring communication frames as packets storing information to be sent and received, comprising:

identifying a topological information management frame among the communication frames sent from other network nodes than said network node of the dual ring network;

comparing an identification number stored in the identified topological information management with an identification number, stored in a database of said network node, of a source network node which has sent said topological information management frame;

if said identification number stored in the identified topological information management and said identification number, stored in the database of said network node, of said source network node are in conformity with each other, and also if validity information, stored in said database, indicative of validity of said source network node is invalid, updating said validity information into valid validity information, updating information representative of a topological state of the dual ring network depending on a classification of said topological information management frame;

if the identification number stored in said topological information management frame and the identification number, stored in said database, of said source network node are in conformity with each other, and also if provisional validity information stored in said database, of said source network node is invalid, updating said provisional validity information into valid provisional validity information.

5. A method of changing a state of a network node for a dual ring network for bidirectionally transferring communication frames as packets storing information to be sent and received, comprising:

identifying a topological information management frame among the communication frames sent from other network nodes than said network node of the dual ring network;

comparing an identification number stored in the identified topological information management with an identification number, stored in a database of said network node, of a source network node which has sent said topological information management frame;

if said identification number stored in the identified topological information management and said identification number, stored in the database of said network node, of said source network node are in conformity with each other, and also if validity information, stored in said database, indicative of validity of said source network node is invalid, updating said validity information into valid validity information, updating information representative of a topological state of the dual ring network depending on an analysis of said topological information management frame;

if the identification number stored in said topological information management frame and the identification number, stored in said database, of said source network node are in conformity with each other, and also if provisional validity information stored in said database, of said source network node is invalid, updating said provisional validity information into valid provisional validity information.

6. A non-transitory recording medium recording therein a program for enabling a network node for a dual ring network for bidirectionally transferring communication frames as packets storing information to be sent and received, to perform:

a process of identifying a topological information management frame among the communication frames sent from other network nodes than said network node of the dual ring network;

a process of comparing an identification number stored in the identified topological information management with an identification number, stored in a database of said network node, of a source network node which has sent said topological information management frame; and if said identification number stored in the identified topological information management and said identification number, stored in the database of said network node, of said source network node are in conformity with each other, and also if validity information, stored in said database, indicative of validity of said source network node is invalid, a process of updating said validity information into valid validity information;

a process of updating information representative of a topological state of the dual ring network depending on a classification of said topological information management frame;

if the identification number stored in said topological information management frame and the identification number, stored in said database, of said source network node are in conformity with each other, and also if provisional validity information stored in said database, of said source network node is invalid, a process of updating said provisional validity information into valid provisional validity information.

7. A non-transitory recording medium recording therein a program for enabling a network node for a dual ring network for bidirectionally transferring communication frames as packets storing information to be sent and received, to perform:

a process of identifying a topological information management frame among the communication frames sent from other network nodes than said network node of the dual ring network;

a process of comparing an identification number stored in the identified topological information management with an identification number, stored in a database of said network node, of a source network node which has sent said topological information management frame; and if said identification number stored in the identified topological information management and said identification number, stored in the database of said network node, of said source network node are in conformity with each other, and also if validity information, stored in said database, indicative of validity of said source network node is invalid, a process of updating said validity information into valid validity information;

a process of updating information representative of a topological state of the dual ring network depending on an analysis of said topological information management frame;

if the identification number stored in said topological information management frame and the identification number, stored in said database, of said source network node are in conformity with each other, and also if provisional validity information stored in said database, of said source network node is invalid, a process of updating said provisional validity information into valid provisional validity information.

* * * * *